(12) United States Patent
Asada et al.

(10) Patent No.: US 7,365,776 B2
(45) Date of Patent: Apr. 29, 2008

(54) IMAGE PICKUP DEVICE

(75) Inventors: Ryoji Asada, Hirakata (JP); Hiromasa Funakoshi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 564 days.

(21) Appl. No.: 10/531,732

(22) PCT Filed: Oct. 17, 2003

(86) PCT No.: PCT/JP03/13338

§ 371 (c)(1),
(2), (4) Date: Apr. 18, 2005

(87) PCT Pub. No.: WO2004/043058

PCT Pub. Date: May 21, 2004

(65) Prior Publication Data

US 2005/0280715 A1    Dec. 22, 2005

(30) Foreign Application Priority Data

Nov. 5, 2002  (JP) ............................. 2002-320591

(51) Int. Cl.
*H04N 5/228*  (2006.01)
(52) U.S. Cl. .................................. 348/222.1; 348/317
(58) Field of Classification Search .................. 348/97, 348/441–459, 317, 320, 322, 222.1; 375/240; 386/52–65
See application file for complete search history.

(56) References Cited

U.S. PATENT DOCUMENTS

| | | | |
|---|---|---|---|
| 5,907,364 A * | 5/1999 | Furuhata et al. | 348/459 |
| 6,539,120 B1 * | 3/2003 | Sita et al. | 382/233 |
| 6,728,317 B1 * | 4/2004 | Demos | 375/240.21 |
| 6,788,347 B1 * | 9/2004 | Kim et al. | 348/441 |
| 2002/0130970 A1 * | 9/2002 | Jiang | 348/459 |
| 2003/0189667 A1 * | 10/2003 | Chow | 348/441 |
| 2004/0004672 A1 * | 1/2004 | Carlsgaard et al. | 348/448 |

FOREIGN PATENT DOCUMENTS

| | | |
|---|---|---|
| JP | 04072966 | 7/1990 |
| JP | 04137892 | 9/1990 |
| JP | 05048962 | 8/1991 |
| JP | 2003299038 | 4/2002 |
| JP | 2002-152569 | 5/2002 |
| JP | 2004-015700 | 6/2002 |

\* cited by examiner

*Primary Examiner*—Lin Ye
*Assistant Examiner*—Amy Hsu
(74) *Attorney, Agent, or Firm*—Steptoe & Johnson LLP

(57) ABSTRACT

The present invention provides an imaging apparatus for converting a 24p imaging signal generated with a frame frequency of 24 Hz according to a progressive scanning system into a 60*i* signal with a field frequency of 60 Hz by 2:3 pull-down processing according to an interlace scanning system which is a standard television system. The imaging apparatus prevents occurrence of a horizontal stripe and the like at the center of a screen and prevents degradation in picture quality. According to this inventive imaging apparatus, when the output timing of the 24p imaging signal from an imaging section 2 is not equal to the phase of a 60*i* vertical synchronizing signal, the 24p imaging signal is inputted to a memory section 3 after being delayed by a delay section 8 by a time during which the 60*i* signal is subjected to (½) field scanning, and the 24p imaging signal is written in the memory section 3 in synchronization with the 60*i* vertical synchronizing signal.

15 Claims, 16 Drawing Sheets

F I G. 9
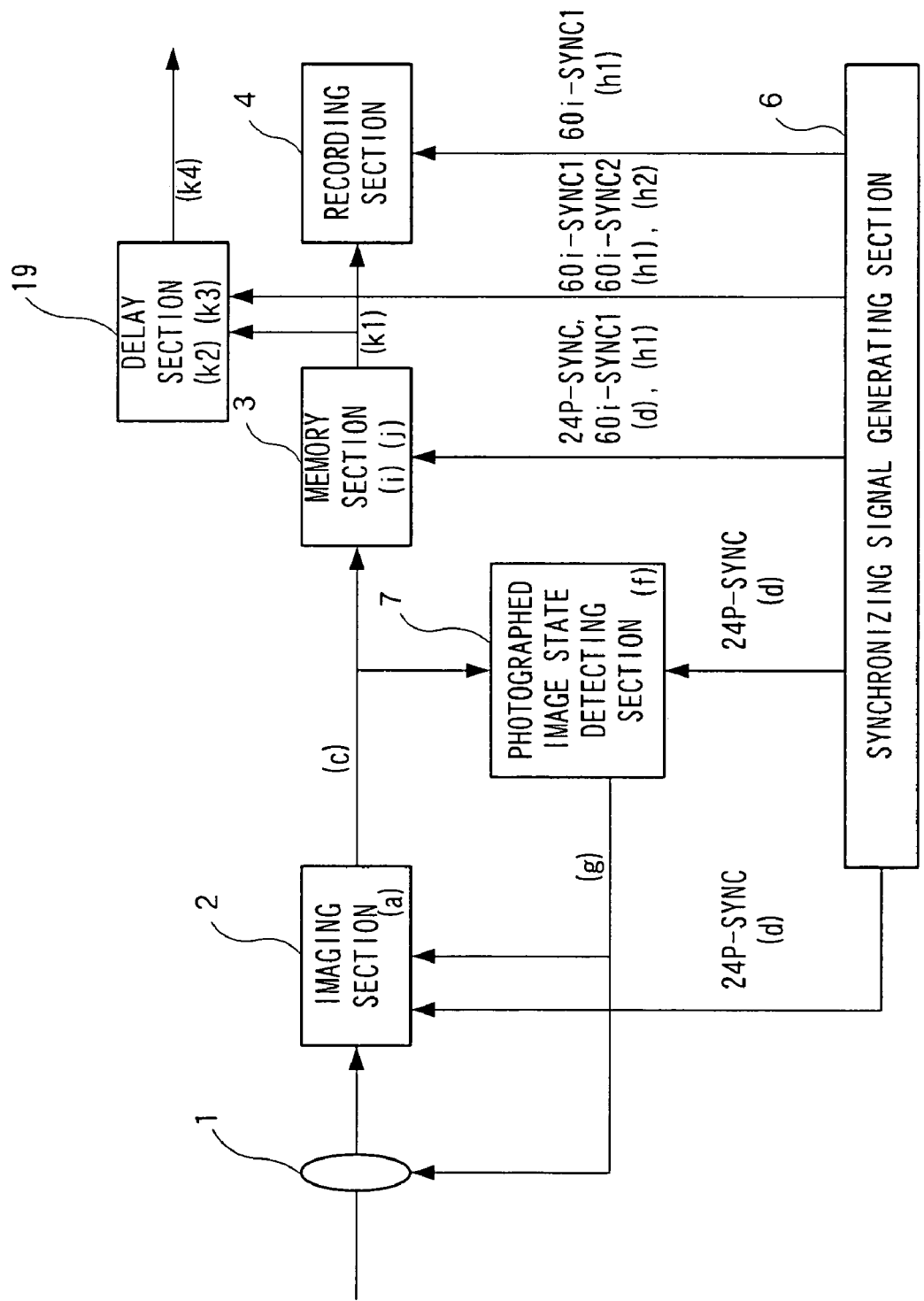

IMAGE PICKUP DEVICE

TECHNICAL FIELD

The present invention relates to an imaging apparatus which can generate an imaging signal with a frame frequency of 24 Hz used for movies and so on according to a progressive scanning system and convert the imaging signal into an interlace signal with a field frequency of 60 Hz according to an interlace scanning system which is a standard television system.

BACKGROUND ART

The recent development of HD (High Definition) broadcasting equipment has enabled imaging apparatuses integrated with VTRs, so-called camcorders to have an image whose vertical resolution is nearly twice that of an image obtained with a field frequency of 60 Hz according to an interlace scanning system which is a standard television system. In response to high-quality images achieved thus by the imaging apparatuses integrated with VTRs, film shooting and so on have become active using the imaging apparatuses integrated with VTRs.

An imaging apparatus such as the imaging apparatus integrated with a VTR performs photographing according to the progressive scanning system with a frame frequency of 24 Hz in such a manner as to photograph 24 still-frame pictures/second like a 24 exposure film camera (e.g., Japanese Patent Laid-Open No. 2002-152569).

Further, such an imaging apparatus is configured so that an imaging signal obtained by the progressive scanning system with a frame frequency of 24 Hz (hereinafter referred to as a 24p imaging signal) is subjected to 2:3 pull-down processing, the signal is converted into an image signal obtained with a field frequency of 60 Hz by the interlace scanning system which is a standard television system (hereinafter referred to as a 60i signal), and the image signal is recorded in a video tape. The imaging apparatus is configured thus for the following advantage: the conversion into the 60i signal allows a recording section to have a conventional configuration. Further, a display section such as an external monitor and a VF (view finder) for confirming a recorded image on the spot also can be configured in a conventional manner. Therefore, it is not necessary to develop a recording section and a display section for the progressive scanning system, thereby reducing the price. A so-called 2:3 pull-down signal obtained by the conversion into the 60i signal by the 2:3 pull-down processing can be converted into a signal with a frame frequency of 24 Hz according to the progressive scanning system by performing so-called 2:3 reverse pull-down processing.

The following will describe a conventional imaging apparatus capable of recording a 24p imaging signal. FIG. 15 is a block diagram showing the configuration of the imaging apparatus.

In FIG. 15, reference numeral 1 denotes a lens section. The lens section 1 is constituted of a lens of an optical system, an optical aperture, a mechanical shutter or an electronic shutter, and so on. Reference numeral 2 denotes an imaging section. The imaging section 2 is constituted of a CCD (Charge Coupled Device). Further, the imaging section 2 transfers accumulated charge by progressive scanning and outputs a 24p imaging signal every (1/24) second.

Reference numeral 3 denotes a memory section. The memory section 3 writes a 24p imaging signal in a memory area (not shown), performs 2:3 pull-down processing to convert the signal into a 60i signal of the standard television system, and outputs a so-called 2:3 pull-down signal. That is, an odd-numbered line (odd) and an even-numbered line (even) of an interlace signal are alternately outputted from the memory section 3 every (1/60) second.

Reference numeral 4 denotes a recording section. The recording section 4 generates a video signal which is obtained by adding a 60i vertical synchronizing signal (60i--SYNC) of the 60i signal to the 2:3 pull-down signal from the memory section 3, and the recording section 4 records the video signal in a recording medium such as a videotape.

Reference numeral 5 denotes a display section such as a VF. The display section 5 generates a display signal which is obtained by adding the 60i vertical synchronizing signal (60i--SYNC) of the 60i signal to the 2:3 pull-down signal from the memory section 3, and the display section 5 displays the display signal.

Reference numeral 6 denotes a synchronizing signal generating section. The synchronizing signal generating section 6 generates a vertical synchronizing signal for a 24p imaging signal (hereinafter referred to as a 24p vertical synchronizing signal) and a vertical synchronizing signal for a 60i signal (hereafter referred to as a 60i vertical synchronizing signal).

Reference numeral 7 denotes a photographed image state detecting section. The photographed image state detecting section 7 detects a state of a photographed image and outputs a control signal to the lens section 1 and the imaging section 2.

Referring to FIGS. 15 and 16, the following will describe the operations of the imaging apparatus thus configured. FIG. 16 is a diagram for explaining the operations of the imaging apparatus and shows the signal states and operations of (a) to (d) and (f) to (k) shown in FIG. 15.

FIG. 16(a) shows the output timing of the 24p imaging signal.

FIGS. 16(b) and 16(c) show the outputting operations of the 24p imaging signal by the imaging section 2.

FIG. 16(d) shows the 24p vertical synchronizing signal.

FIG. 16(f) shows a detecting operation of a state of a photographed image for the 24p imaging signal, the state being detected by the photographed image state detecting section 7.

FIG. 16(g) shows an outputting operation of a control signal by the photographed image state detecting section 7.

FIG. 16(h) shows the 60i vertical synchronizing signal.

FIG. 16(i) shows a writing operation of the memory section 3.

FIG. 16(j) shows a reading operation of the memory section 3.

FIG. 16(k) shows an output signal to the recording section 4 and the display section 5.

An optical image inputted through the lens section 1 is outputted as a 24p imaging signal by the imaging section 2. As shown in FIG. 16(a), the imaging section 2 outputs the 24p imaging signal every (1/24) second in synchronization with the 24p vertical synchronizing signal. A method of outputting the signal includes a method of outputting the signal over a (1/24) second as indicated by FIG. 16(b) and a method of intermittently outputting the signal in a shorter time than a (1/24) second as shown in FIG. 16(c). Numbers in FIGS. 16(b) and 16(c) indicate the frame numbers of the 24p imaging signal. Diagonally shaded parts in FIG. 16(c) indicate no-signal output periods (blanking periods).

The method of FIG. 16(c) is applied to an imaging apparatus using a CCD (Charge Coupled Device). This is because when the CCD is used, a longer transfer time of accumulated charge seriously degrades picture quality and it is desirable to output (transfer) charge within a (1/30) second. The following will describe the case where the 24p imaging signal is outputted over a (1/30) second every (1/24) second according to the method of FIG. 16(c).

The photographed image state detecting section 7 detects a state of a photographed image, for example, an average value and a peak value of a luminance signal and a color-difference signal in each frame of the 24p imaging signal outputted from the imaging section 2 (FIG. 16(f)), and the photographed image state detecting section 7 outputs necessary control data (control signal) to the lens section 1 and the imaging section 2 based on the data (FIG. 16(g)). A frame 1:A, a frame 2:B, . . . of FIG. 16(f) indicate that a photographed image state A, a photographed image state B, . . . are detected from a frame 1, a frame 2, . . . . Further, control data A, control data B, . . . of FIG. 16(g) indicate that control data based on the photographed image state A, the photographed image state B, . . . is outputted from the photographed image state detecting section 7.

The memory section 3 performs the writing operation and the reading operation of FIGS. 16(i) and 16(j). That is, the memory section 3 writes the 24p imaging signal in a memory area (not shown) over a (1/30) second and performs 2:3 pull-down processing to convert two frames of the 24p imaging signal into five fields of the 60i signal. Then, the memory section 3 alternately reads an odd-numbered line (odd) and an even-numbered line (even) of the interlace signal every (1/60) second in synchronization with a 60i vertical synchronizing signal, and the memory section 3 outputs the signal to the recording section 4 and the display section 5 as a 2:3 pull-down signal. That is, the memory section 3 outputs the signal after converting, for example, frames 1 and 2 of the 24p imaging signal into 1-odd (hereinafter odd will be simply referred to as o), 1-even (hereinafter even will be simply referred to as e), 2-o, 2-e, and 2-o of the 60i signal.

The synchronizing signal generating section 6 outputs the 24p vertical synchronizing signal (FIG. 16(d)) and the 60i vertical synchronizing signal (FIG. 16(h)) to each section to cause the imaging apparatus to perform the operations.

However, in the conventional imaging apparatus, the 24p imaging signal is outputted from the imaging section over a (1/30) second every (1/24) second as shown in FIG. 16(c). The 2:3 pull-down signal is read from the memory section every (1/60) second as shown in FIG. 16(j). Thus, the output timing of the 24p imaging signal from the imaging section, that is, the writing timing of the 24p imaging signal to the memory section becomes different from the output timing of the 2:3 pull-down signal from the memory section, so that the writing operation of the 24p imaging signal may be started by the memory section 3 when the memory section 3 reads a signal around the center of one field. That is, the 24p imaging signal may be changed from a blanking period to an effective period during a reading operation of the 2:3 pull-down signal on a display position around a (1/2) field.

In this way, when the writing operation of the 24p imaging signal is started during the reading operation of the 2:3 pull-down signal on the display position of the (1/2) field, circuits in the memory section are varied in signal level because the 24p imaging signal changes from the blanking period to the effective period. Subsequently, a horizontal stripe caused by the difference in signal level appears around the display position of the (1/2) field, that is, around the center of a screen, thereby degrading picture quality.

Conventional configurations are applicable to the recording section and the display section for processing the 60i signal, whereas the photographed image state detecting section needs to process the 24p imaging signal and is mainly designed for processing the 60i signal. In this case, another circuit is necessary for the 24p imaging signal. Alternatively, when the circuit for the 24p imaging signal is shared for the 60i signal, the processing becomes complicated.

Another problem of 2:3 pull-down is that the frames of the 24p imaging signal are unevenly reproduced and result in jerky motions. This is because two frames of the 24p imaging signal are converted into five fields of the 60i signal and the frames are displayed with the same field like (2-o, 2-e) and (2-o, 3-e).

Further, a 24p imaging signal with a high vertical band is converted into a 60i signal, the 24p imaging signal having a vertical resolution nearly twice that of an image signal obtained with a field frequency of 60 Hz according to the interlace scanning method which is a standard television system. In this case, the vertical band of the aliasing signal of the 60i signal becomes a wide band, resulting in a larger flicker and lower visibility on a screen.

DISCLOSURE OF THE INVENTION

The present invention is devised in view of the problems and has as its object the provision of an imaging apparatus, in which when the output of a 24p imaging signal is not equal to the phase of a 60i vertical synchronizing signal, the output timing is delayed by a time during which the 60i signal is subjected to (1/2) field scanning, the 24p imaging signal is written in a memory section in synchronization with the 60i vertical synchronizing signal, and thus circuits in the memory section are not varied in signal level, thereby preventing the occurrence of a horizontal stripe and the like at the center of a screen and preventing a degradation in picture quality.

Further, when the output of the 24p imaging signal is delayed in this manner, the processing of a photographed image state detecting section is performed in synchronization with the 60i vertical synchronizing signal. Thus, it is possible to readily detect a state of a photographed image for the 24p imaging signal by using a circuit for the 60i signal of the photographed image state detecting section and eliminate the need for adding a circuit for the 24p imaging signal.

Moreover, an object of the present invention is to provide an imaging apparatus, in which two frames of the 24p imaging signal are converted into five fields of the 60i signal by 2:3 pull-down processing, and frames of the 60i signal are added that correspond to two or more successive frames of the original 24p imaging signal, so that a mixed signal is generated which interpolates a field around the fifth field having been converted by 2:3 pull-down processing. Then, by replacing the fifth field with the mixed signal, it is possible to reduce jerky motions which are the problem of 2:3 pull down.

Besides, an object of the present invention is to provide an imaging apparatus, in which the 2:3 pull-down signal is converted into the frame of the 60i signal which has one-to-one correspondence with the frame of the original 24p imaging signal in which the fifth field converted by 2:3 pull-down processing is removed. Then, a display signal is generated which has a black level signal inserted so as to have equal frame intervals. Hence, it is possible to reduce jerky motions which are the problem of 2:3 pull down and reproduce flicker of a mechanical shutter as in the photographing of a film camera.

Further, an object of the present invention is to provide an imaging apparatus, in which the vertical band of an aliasing signal of the 2:3 pull-down signal (60*i* signal) is narrowed by limiting the vertical band of the 24p imaging signal, thereby considerably reducing flicker and improving picture quality.

An imaging apparatus according to claim 1 of the present invention for converting, by 2:3 pull-down processing, a 24p imaging signal generated with a frame frequency of 24 Hz according to a progressive scanning system into a 60*i* signal with a field frequency of 60 Hz according to an interlace scanning system which is a standard television system comprises: an imaging section for outputting a 24p imaging signal of one frame over a (1/30) second every (1/24) second in synchronization with the vertical synchronizing signal of the 24p imaging signal; a delay section which outputs a 24p imaging signal of one frame as it is when the 24p imaging signal is outputted from the imaging section at the same timing as the phase of the vertical synchronizing signal of the 60*i* signal, and outputs the 24p imaging signal of one frame after delaying the 24p imaging signal by a time during which the 60*i* signal is subjected to (½) field scanning when the 24p imaging signal is outputted at different timing; a memory section for writing, over a (1/30) second, the 24p imaging signal of one frame having been outputted from the delay section, and outputting a so-called 2:3 pull-down signal, in which two frames of the 24p imaging signal are converted into the 60*i* signal of five fields by 2:3 pull-down processing, every (1/60) second in synchronization with the vertical synchronizing signal of the 60*i* signal; a recording section for recording the 2:3 pull-down signal from the memory section in a recording medium; and a display section for displaying the 2:3 pull-down signal from the memory section.

An imaging apparatus according to claim 2 of the present invention for converting a 24p imaging signal generated with a frame frequency of 24 Hz according to a progressive scanning system into a 60*i* signal with a field frequency of 60 Hz by 2:3 pull-down processing according to an interlace scanning system which is a standard television system comprises: an imaging section which outputs the 24p imaging signal of one frame over a (1/30) second in synchronization with the vertical synchronizing signal of the 24p imaging signal when the vertical synchronizing signal of the 24p imaging signal is equal in phase to the vertical synchronizing signal of the 60*i* signal, and starts outputting the 24p imaging signal after delaying the 24p imaging signal by a time during which the 60*i* signal is subjected to (½) field scanning when the signals are not equal in phase; a memory section for writing, over a (1/30) second, the 24p imaging signal of one frame having been outputted from the imaging section, and outputting a so-called 2:3 pull-down signal, in which two frames of the 24p imaging signal are converted into the 60*i* signal of five fields by 2:3 pull-down processing, every (1/60) second in synchronization with the vertical synchronizing signal of the 60*i* signal; a recording section for recording the 2:3 pull-down signal from the memory section in a recording medium; and a display section for displaying the 2:3 pull-down signal from the memory section.

An imaging apparatus of claim 3 is an imaging apparatus according to claim 1 of the present invention, wherein in the memory section, two frames of the 24p imaging signal are converted into the 60*i* signal of five fields by 2:3 pull-down processing, and a mixed signal is generated by adding frames of the 60*i* signal, the frames corresponding to two or more successive frames of the original 24p imaging signal, and the 60*i* signal of the fifth field having been converted by 2:3 pull-down processing is replaced with the mixed signal before being outputted.

An imaging apparatus of claim 4 is an imaging apparatus according to claim 2 of the present invention, wherein in the memory section, two frames of the 24p imaging signal are converted into the 60*i* signal of five fields by 2:3 pull-down processing, and a mixed signal is generated by adding frames of the 60*i* signal, the frames corresponding to two or more successive frames of the original 24p imaging signal, and the 60*i* signal of the fifth field having been converted by 2:3 pull-down processing is replaced with the mixed signal before being outputted.

An imaging apparatus of claim 5 is an imaging apparatus according to claim 3 of the present invention, wherein the mixed signal is generated by adding a frame including the fifth field and the subsequent frame.

An imaging apparatus of claim 6 is an imaging apparatus according to claim 4 of the present invention, wherein the mixed signal is generated by adding a frame including the fifth field and the subsequent frame.

An imaging apparatus of claim 7 is an imaging apparatus according to claim 3 of the present invention, wherein the mixed signal is generated in phase with the fifth field.

An imaging apparatus of claim 8 is an imaging apparatus according to claim 4 of the present invention, wherein the mixed signal is generated in phase with the fifth field.

An imaging apparatus of claim 9 is an imaging apparatus according to claim 5 of the present invention, wherein the mixed signal is generated in phase with the fifth field.

An imaging apparatus of claim 10 is an imaging apparatus according to claim 6 of the present invention, wherein the mixed signal is generated in phase with the fifth field.

An imaging apparatus according to claim 11 of the present invention for converting, by 2:3 pull-down processing, a 24p imaging signal generated with a frame frequency of 24 Hz according to a progressive scanning system into a 60*i* signal with a field frequency of 60 Hz according to an interlace scanning system which is a standard television system comprises: an imaging section which outputs the 24p imaging signal of one frame over a (1/30) second every (1/24) second in synchronization with the vertical synchronizing signal of the 24p imaging signal; a memory section for writing, over a (1/30) second, the 24p imaging signal of one frame having been outputted from the imaging section, and outputting a so-called 2:3 pull-down signal, in which two frames of the 24p imaging signal are converted into the 60*i* signal of five fields by 2:3 pull-down processing, every (1/60) second in synchronization with the vertical synchronizing signal of the 60*i* signal; a recording section for recording the 2:3 pull-down signal from the memory section in a recording medium; and a display section which converts the 2:3 pull-down signal from the memory section into the frame of the 60*i* signal which has one-to-one correspondence with the frame of the original 24p imaging signal in which the fifth field is removed, generates a display signal having a black level signal inserted so as to have equal frame intervals, and displays the display signal.

An imaging apparatus according to claim 12 of the present invention for converting, by 2:3 pull-down processing, a 24p imaging signal generated with a frame frequency of 24 Hz according to a progressive scanning system into a 60*i* signal with a field frequency of 60 Hz according to an interlace scanning system which is a standard television system comprises: an imaging section which outputs the 24p imaging signal of one frame over a (1/30) second every (1/24) second in synchronization with the vertical synchronizing signal of the 24p imaging signal; a memory section which limits the vertical band of the 24p imaging signal of one frame having been outputted from the imaging section, writes the signal in a memory area over a (1/30) second, and outputs a so-called 2:3 pull-down signal, in which two frames of the 24p imaging signal are converted into the 60*i* signal of five fields by 2:3 pull-down processing, every (1/60) second in synchronization with the vertical synchronizing signal of the 60*i* signal; a recording section for recording the 2:3 pull-down signal from the memory section in a recording medium; and a display section for displaying the 2:3 pull-down signal from the memory section.

An imaging apparatus of claim 13 is an imaging apparatus according to claim 12 of the present invention, wherein the memory section limits the vertical band by adding vertically adjacent two lines of the 24p imaging signal.

An imaging apparatus of claim 14 is an imaging apparatus according to claim 12 of the present invention, wherein the memory section can output a 2:3 pull-down signal obtained by 2:3 pull-down processing after limiting the vertical band of the 24p imaging signal and a 2:3 pull-down signal obtained by 2:3 pull-down processing without limiting the vertical band, and the memory section outputs the latter 2:3 pull-down signal to the recording section and outputs the former 2:3 pull-down signal to the display section.

An imaging apparatus of claim 15 is an imaging apparatus according to claim 13 of the present invention, wherein the memory section can output a 2:3 pull-down signal obtained by 2:3 pull-down processing after limiting the vertical band of the 24p imaging signal and a 2:3 pull-down signal obtained by 2:3 pull-down processing without limiting the vertical band, and the memory section outputs the latter 2:3 pull-down signal to the recording section and outputs the former 2:3 pull-down signal to the display section.

As described above, according to the imaging apparatus of the present invention, when the output of the 24p imaging signal is not equal to the phase of the 60*i* vertical synchronizing signal, the output timing is delayed by a time during which the 60*i* signal is subjected to (½) field scanning, so that the 24p imaging signal can be written in the memory section in synchronization with the 60*i* vertical synchronizing signal. With this operation, the circuits in the memory section are not varied in signal level and thus it is possible to prevent the occurrence of a horizontal stripe and the like at the center of a screen and prevent a degradation in picture quality.

Moreover, when the output of the 24p imaging signal is delayed in this manner, the processing of the photographed image state detecting section is performed in synchronization with the 60*i* vertical synchronizing signal. Thus, it is possible to readily detect a state of a photographed image for the 24p imaging signal by using a circuit for the 60*i* signal of the photographed image state detecting section and eliminate the need for adding a circuit for the 24p imaging signal.

Furthermore, two frames of the 24p imaging signal are converted into five fields of the 60*i* signal by 2:3 pull-down processing, and frames of the 60*i* signal are added that correspond to two or more successive frames of the original 24p imaging signal, so that a mixed signal is generated which interpolates a field around the fifth field having been converted by 2:3 pull-down processing. Then, by replacing the fifth field with the mixed signal, it is possible to reduce jerky motions which are the problem of 2:3 pull down.

Besides, the 2:3 pull-down signal is converted into the frame of the 60*i* signal which has one-to-one correspondence with the frame of the original 24p imaging signal in which the fifth field converted by 2:3 pull-down processing is removed. Then, display signal is generated which has a black level signal inserted so as to have equal frame intervals. Hence, it is possible to reduce jerky motions which are the problem of 2:3 pull down and reproduce flicker of a mechanical shutter as in the photographing of a film camera.

The vertical band of an aliasing signal of the 2:3 pull-down signal (60*i* signal) is narrowed by limiting the vertical band of the 24p imaging signal, thereby considerably reducing flicker and improving picture quality.

BRIEF DESCRIPTION OF THE DRAWINGS

FIG. 9 is a block diagram showing the configuration of an imaging apparatus according to Embodiment 4 of the present invention;

BEST MODE FOR CARRYING OUT THE INVENTION

The following will describe embodiments of the present invention in accordance with the accompanying drawings. The embodiments below are just examples and the present invention is not limited to these embodiments.

EMBODIMENT 1

Figure 1:
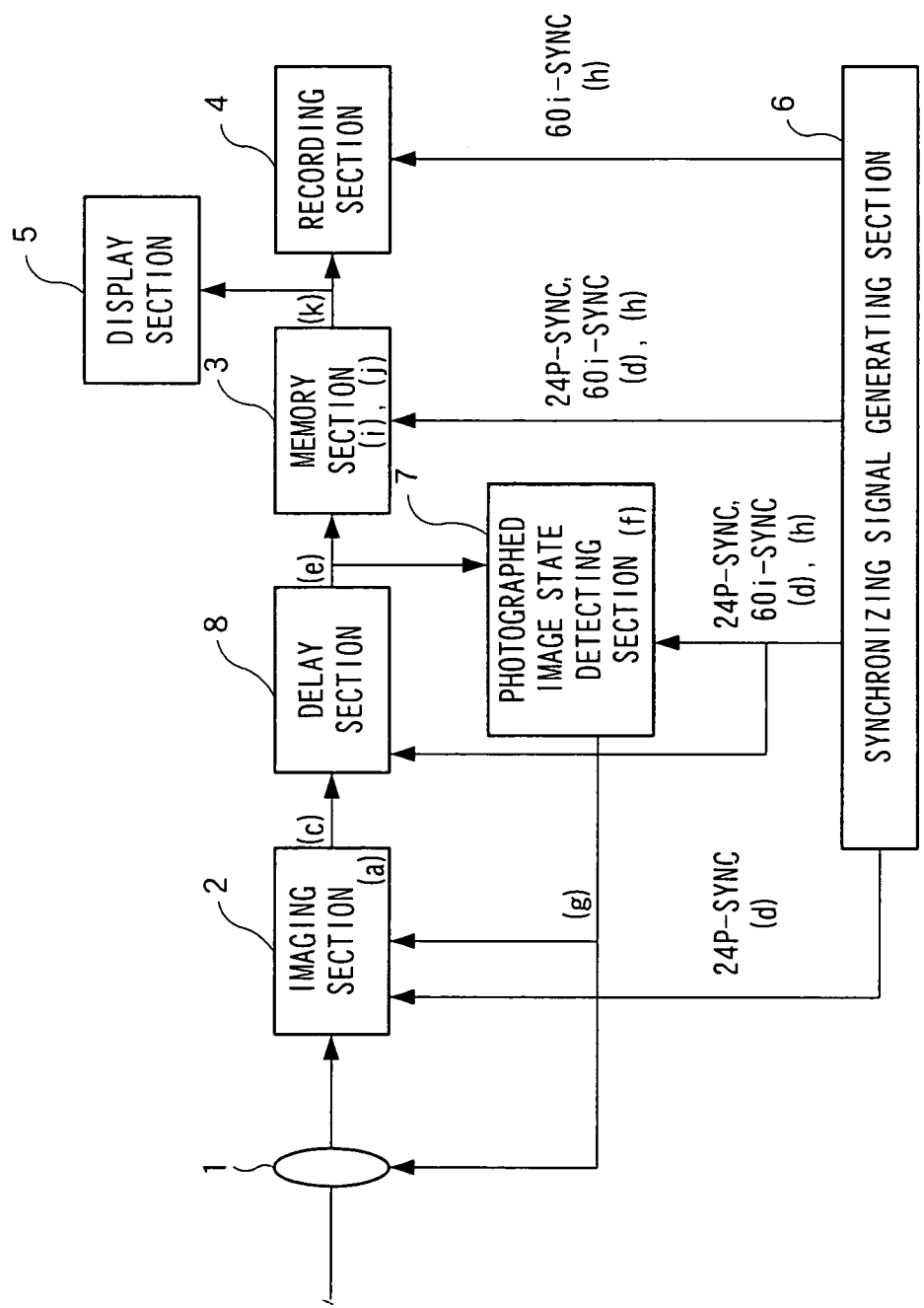
FIG. 1 is a block diagram showing the configuration of an imaging apparatus according to Embodiment 1 of the present invention.
Figure 15:
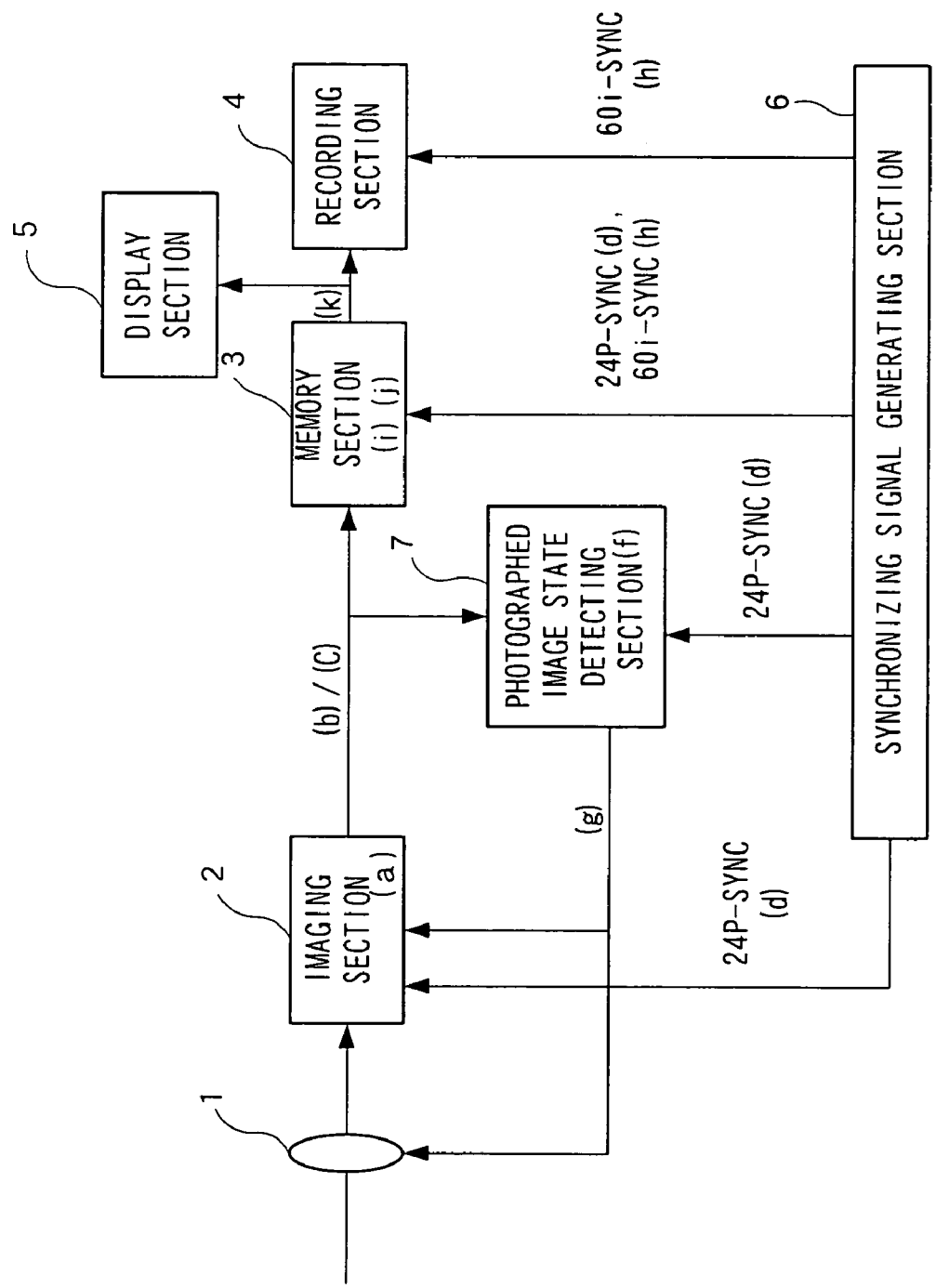
FIG. 15 is a block diagram showing the configuration of a conventional imaging apparatus.
Figure 16:
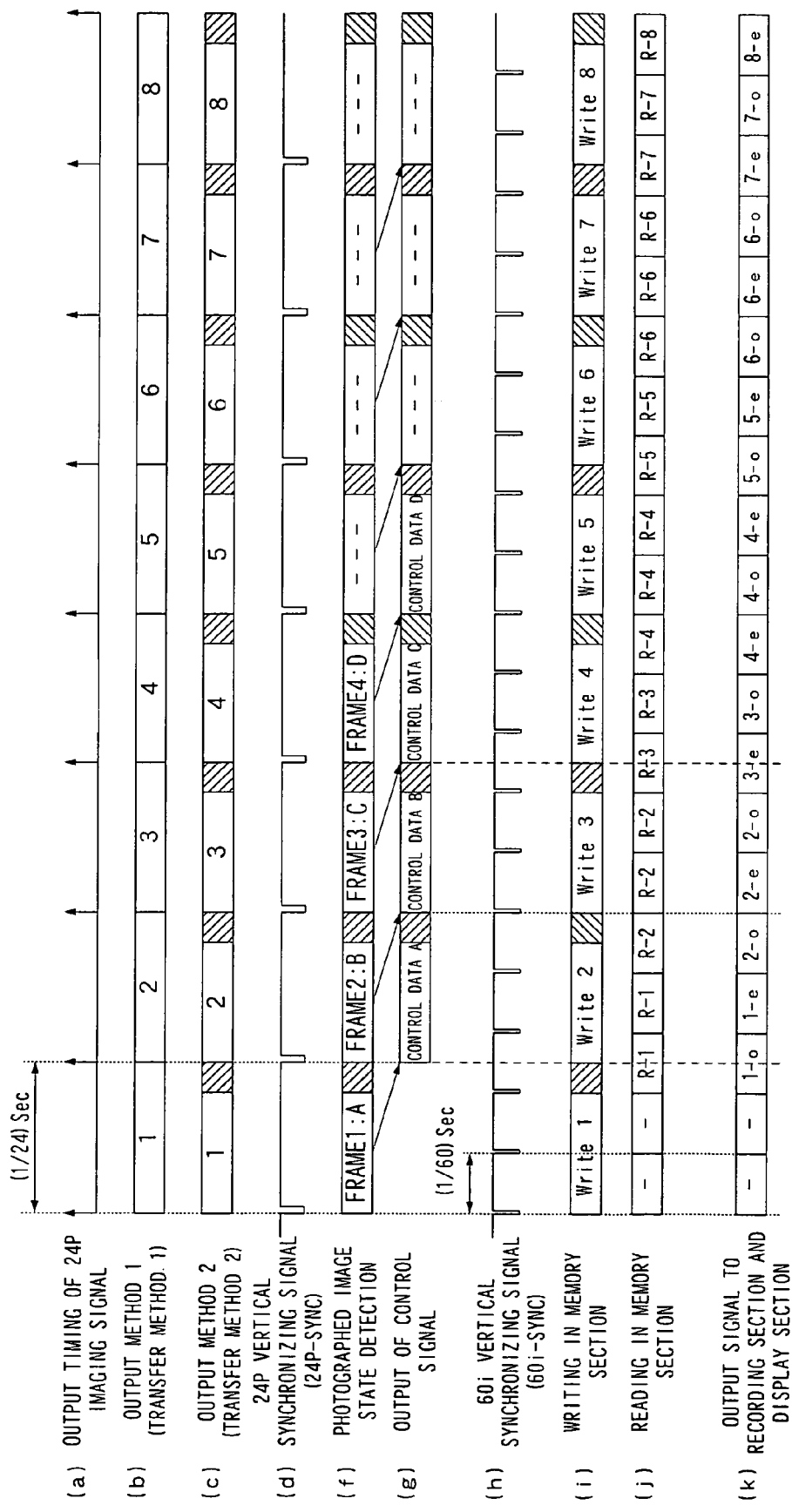
FIG. 16 is a diagram for explaining the operations of the conventional imaging apparatus.

FIG. 1 is a block diagram showing the configuration of an imaging apparatus according to Embodiment 1 of the present invention. Members corresponding to the members described in FIG. 15 are indicated by the same reference numerals and the detailed explanation thereof is omitted.

In FIG. 1, reference numeral 1 denotes a lens section. The lens section 1 is constituted of a lens of an optical system, an optical aperture, a mechanical shutter or an electronic shutter, and so on. Reference numeral 2 denotes an imaging section. The imaging section 2 is constituted of a CCD (Charge Coupled Device). Further, the imaging section 2 transfers accumulated charge by progressive scanning and outputs a 24p imaging signal every (1/24) second.

Reference numeral 3 denotes a memory section. The memory section 3 writes the 24p imaging signal in a memory area (not shown) over a (1/30) second, performs 2:3 pull-down processing to convert the signal into a 60$i$ signal of a standard television system, and outputs a so-called 2:3 pull-down signal. That is, an odd-numbered line (odd) and an even-numbered line (even) of an interlace signal are alternately outputted from the memory section 3 every (1/60) second.

Reference numeral 4 denotes a recording section. The recording section 4 generates a video signal which is obtained by adding a 60$i$ vertical synchronizing signal (60$i$-SYNC) of the 60$i$ signal to the 2:3 pull-down signal from the memory section 3, and records the video signal in a recording medium such as a video tape.

Reference numeral 5 denotes a display section such as a VF. The display section 5 generates a display signal which is obtained by adding a 60$i$ vertical synchronizing signal (60$i$-SYNC) of the 60$i$ signal to the 2:3 pull-down signal from the memory section 3, and displays the display signal.

Reference numeral 6 denotes a synchronizing signal generating section. The synchronizing signal generating section 6 generates a 24p vertical synchronizing signal (a vertical synchronizing signal for a 24p imaging signal) and a 60$i$ vertical synchronizing signal (a vertical synchronizing signal for a 60$i$ signal).

Reference numeral 7 denotes a photographed image state detecting section. The photographed image state detecting section 7 detects a state of a photographed image and outputs a control signal to the lens section 1 and the imaging section 2.

Reference numeral 8 denotes a delay section. The delay section 8 delays the 24p imaging signal from the imaging section 2 and outputs the signal to the memory section 3.

A photographed image may be displayed on an external monitor and the like as well as the display section. Further, a 60$i$ signal recorded in a recording medium may be reproduced and outputted to the outside.

Embodiment 1 is different from the conventional art in that the delay section 8 is provided. Other sections are almost the same as the conventional art and the operations are also the same as the conventional art.

Figure 2:
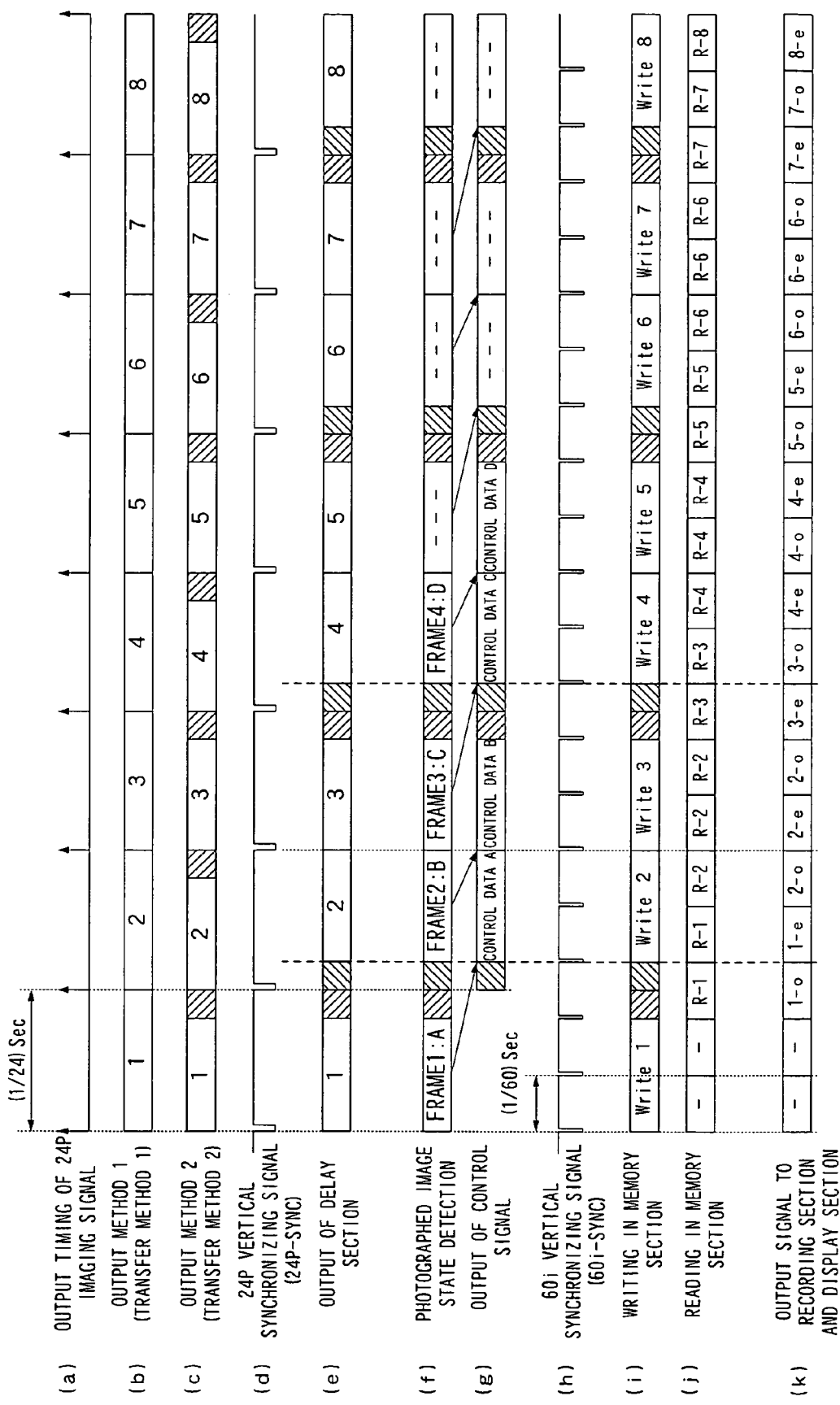
FIG. 2 is a diagram for explaining the operations of the imaging apparatus according to Embodiment 1 of the present invention.

Referring to FIGS. 1 and 2, the following will describe the operations of the imaging apparatus configured thus according to Embodiment 1. FIG. 2 is a diagram for explaining the operations of the imaging apparatus and shows the states of signals (a) to (k) shown in FIG. 1. FIGS. 2(a) to 2(d) and 2(f) to 2(k) show the same signal states and operations as FIGS. 16(a) to 16(d) and FIGS. 16(f) to 16(k). FIG. 2(e) shows an output of the delay section 8.

An optical image inputted through the lens section 1 is outputted as a 24p imaging signal by the imaging section 2. As shown in FIG. 2(a), the imaging section 2 outputs the 24p imaging signal every (1/24) second in synchronization with a 24p vertical synchronizing signal. A method of outputting the signal includes a method of outputting the signal over a (1/24) second as in the conventional art (FIG. 2(b)) and a method of intermittently outputting the signal in a shorter time than a (1/24) second (FIG. 2(c)). Numbers in FIGS. 2(b) and 2(c) indicate the frame numbers of the 24p image signal. Diagonally shaded parts in FIG. 2(c) indicate no-signal output periods (blanking periods).

The following will describe the case where the 24p imaging signal is outputted over a (1/30) second every (1/24) second according to the method of FIG. 2(c) in Embodiment 1 like the conventional art.

When the 24p vertical synchronizing signal (FIG. 2(d)) and the 60$i$ vertical synchronizing signal (FIG. 2(h)) are equal in phase, the delay section 8 outputs the 24p imaging signal from the imaging section 2 as it is without delay. When the signals are not equal in phase, the 24p imaging signal is outputted after being delayed by a time during which the 60$i$ signal is subjected to (1/2) field scanning. That is, when the 24p imaging signal is outputted from the imaging section 2 at the same timing as the 60$i$ vertical synchronizing signal, the delay section 8 outputs the 24p imaging signal as it is. When the 24p imaging signal is outputted at different timing, the 24p imaging signal is delayed and outputted so that the memory section 3 starts a writing operation at the same timing as the 60$i$ vertical synchronizing signal (FIGS. 2(e) and 2(i)).

Thus, the signal of FIG. 2(e) is outputted to the memory section 3 and the photographed image state detecting section 7 (horizontal line parts indicate delay periods in FIG. 2(e)). The photographed image state detecting section 7 detects a state of a photographed image at the same timing as the 60$i$ vertical synchronizing signal as in the conventional art (FIG. 2(f)) and outputs necessary control data (control signal) to the lens section 1 and the imaging section 2 at the same timing as the 60$i$ vertical synchronizing signal (FIG. 2 (g)). As with FIGS. 16(f) and 16(g), a frame 1:A, a frame 2:B, . . . of FIG. 2(f) indicate that a photographed image state A, a photographed image state B, . . . are detected from a frame 1, a frame 2, . . . . Further, control data A, control data B, . . . of FIG. 2(g) indicate that control data based on the photographed image state A, the photographed image state B, . . . is outputted from the photographed image state detecting section 7.

The memory section 3 performs a writing operation and a reading operation indicated by FIGS. 2(i) and 2(j). That is, the 24p imaging signal outputted from the imaging section 2 at different timing from the 60$i$ vertical synchronizing signal is also delayed by the delay section 8 by a time during which the 60$i$ signal is subjected to (1/2) field scanning. Thus, the writing operation of the memory section 3 is started at the same timing as the 60$i$ vertical synchronizing signal.

As shown in FIG. 2(k), a 2:3 pull-down signal is outputted to the recording section 4 and the display section 5 as in the conventional art.

In this way, according to the imaging apparatus of Embodiment 1, the processing of the delay section 8 allows the photographed image state detecting section 7 to detect a state of a photographed image and output a control signal and the memory section 3 to perform the writing operation in synchronization with the vertical synchronizing signal of the 60*i* signal.

The delay section 8 detects the 24p vertical synchronizing signal and the 60*i* vertical synchronizing signal from the synchronizing signal generating section 6 and decides whether the 24p vertical synchronizing signal and the 60*i* vertical synchronizing signal are equal in phase. Thus, it is decided whether the 24p imaging signal should be delayed or not.

As described above, according to Embodiment 1, the photographed image state detecting section 7 can detect a state of a photographed image and output a control signal in synchronization of the vertical synchronizing signal of the 60*i* signal. Hence, even when the photographed image state detecting section is designed mainly for detecting a state of a photographed image for the 60*i* signal, the detection of a state of a photographed image for the 24p imaging signal does not become complicated, the detection using a photographed image state detecting circuit for the 60*i* signal.

Therefore, it is not necessary to add a circuit for the 24p imaging signal.

Further, according to Embodiment 1, the writing operation of the memory section 3 is also performed in synchronization with the vertical synchronizing signal of the 60*i* signal, thereby preventing the circuits in the memory section 3 from varying in signal level. Hence, it is possible to prevent the occurrence of a horizontal stripe around a display position of a (½) field, i.e., around the center of a screen, thereby preventing a degradation in picture quality.

EMBODIMENT 2

Figure 3:
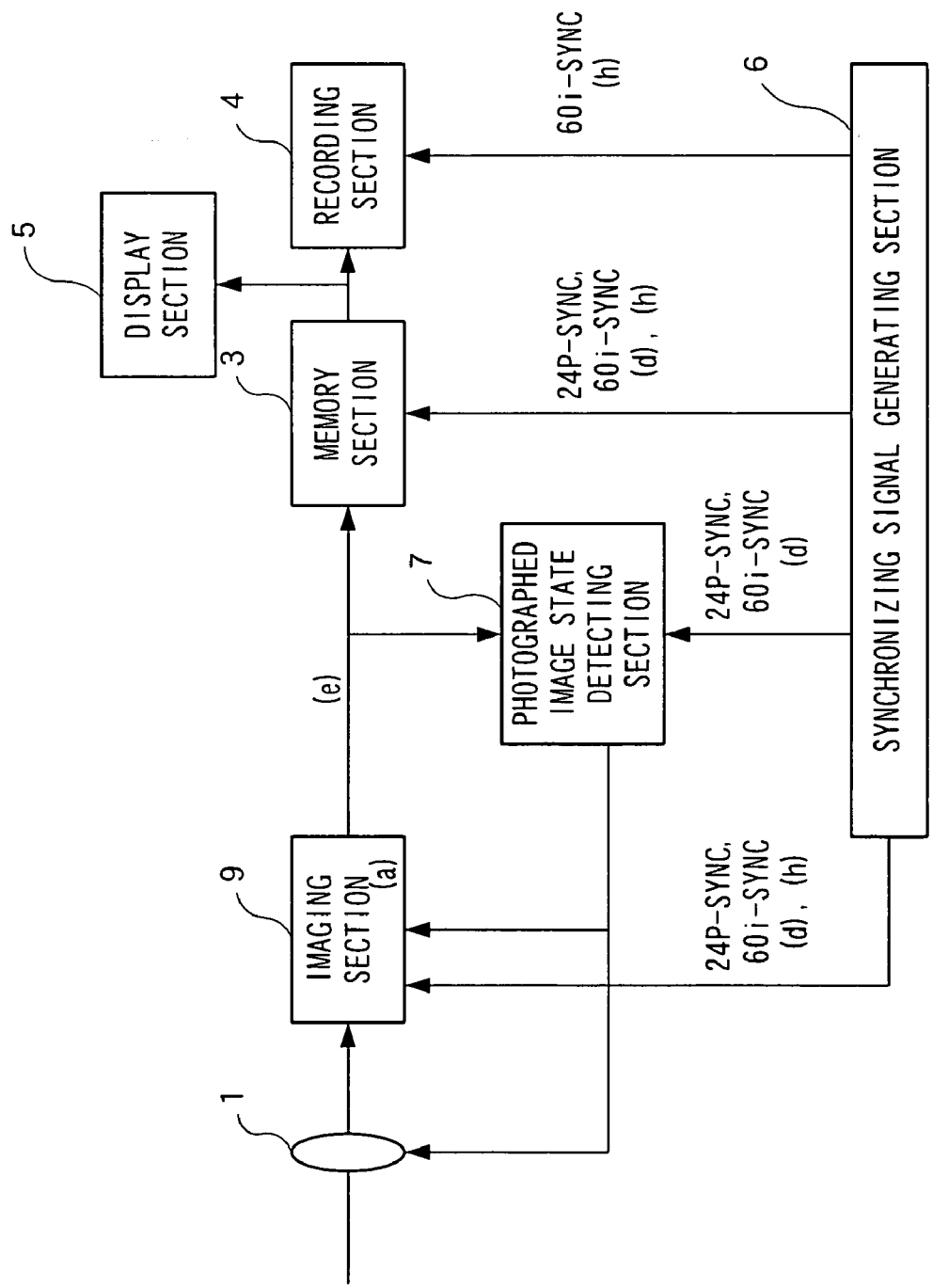
FIG. 3 is a block diagram showing the configuration of an imaging apparatus according to Embodiment 2 of the present invention.

FIG. 3 is a block diagram showing the configuration of an imaging apparatus according to Embodiment 2 of the present invention. Members corresponding to the members described in FIGS. 1 and 15 are indicated by the same reference numerals and the detailed explanation thereof is omitted.

Embodiment 2 is different from Embodiment 1 and the conventional art in that a delay section is not provided and an imaging section 9 can delay the output timing of a 24p imaging signal. Other sections are almost the same as Embodiment 1 and the conventional art and the operations are also the same as Embodiment 1 and the conventional art.

Figure 4:
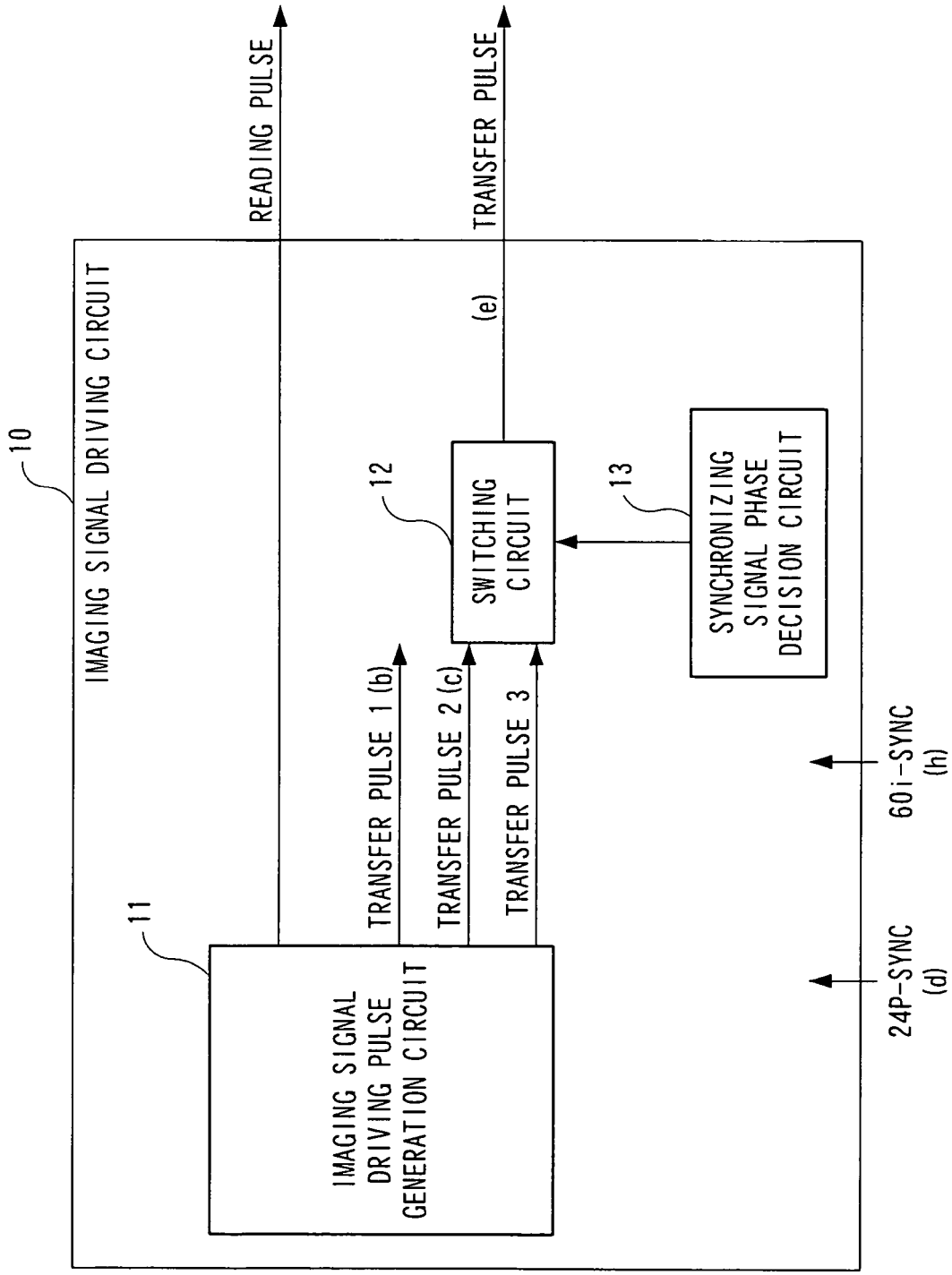
FIG. 4 is a block diagram showing an example of the internal configuration of an imaging section in the imaging apparatus according to Embodiment 2 of the present invention.
Figure 10:
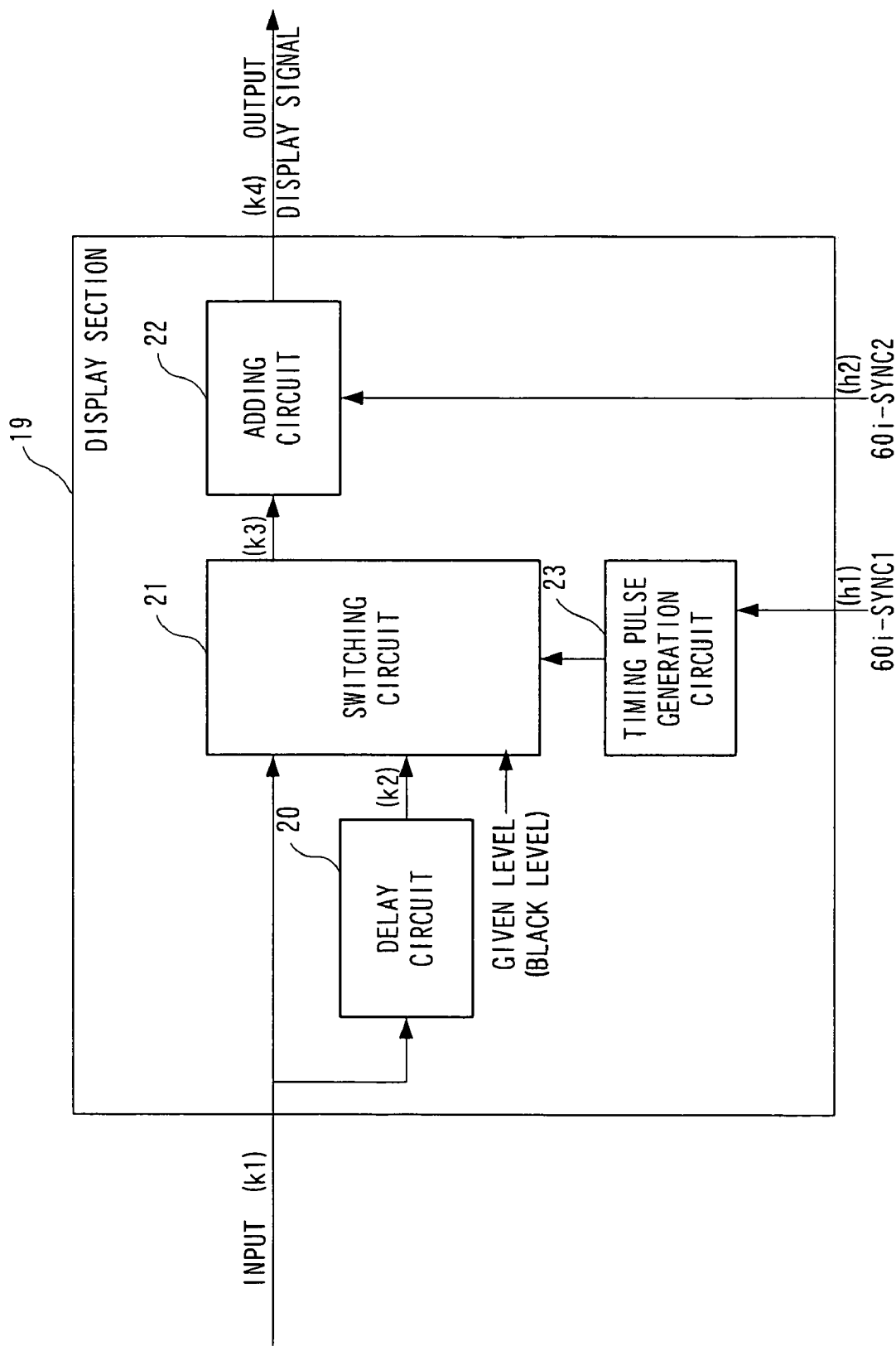
FIG. 10 is a block diagram showing an example of the internal configuration of a display section in the imaging apparatus according to Embodiment 4 of the present invention.

FIG. 4 is a block diagram showing an example of the internal configuration of the imaging section 9. In FIG. 10, reference numeral 10 denotes an imaging signal driving circuit provided in the imaging section 9.

Reference numeral 11 denotes an imaging signal driving pulse generation circuit. The imaging signal driving pulse generation circuit 11 outputs a reading pulse and transfer pulses 1 to 3, which will be described later, based on a 24p vertical synchronizing signal and a 60*i* vertical synchronizing signal.

Reference numeral 12 denotes a switching circuit. The switching circuit 12 switches and outputs the transfer pulses 1 to 3 having been outputted from the imaging signal driving pulse generation circuit 11.

Reference numeral 13 denotes a synchronizing signal phase decision circuit. The synchronizing signal phase decision circuit 13 decides the phase relationship of the 24p vertical synchronizing signal and the 60*i* vertical synchronizing signal and controls the switching circuit 12.

Figure 5:
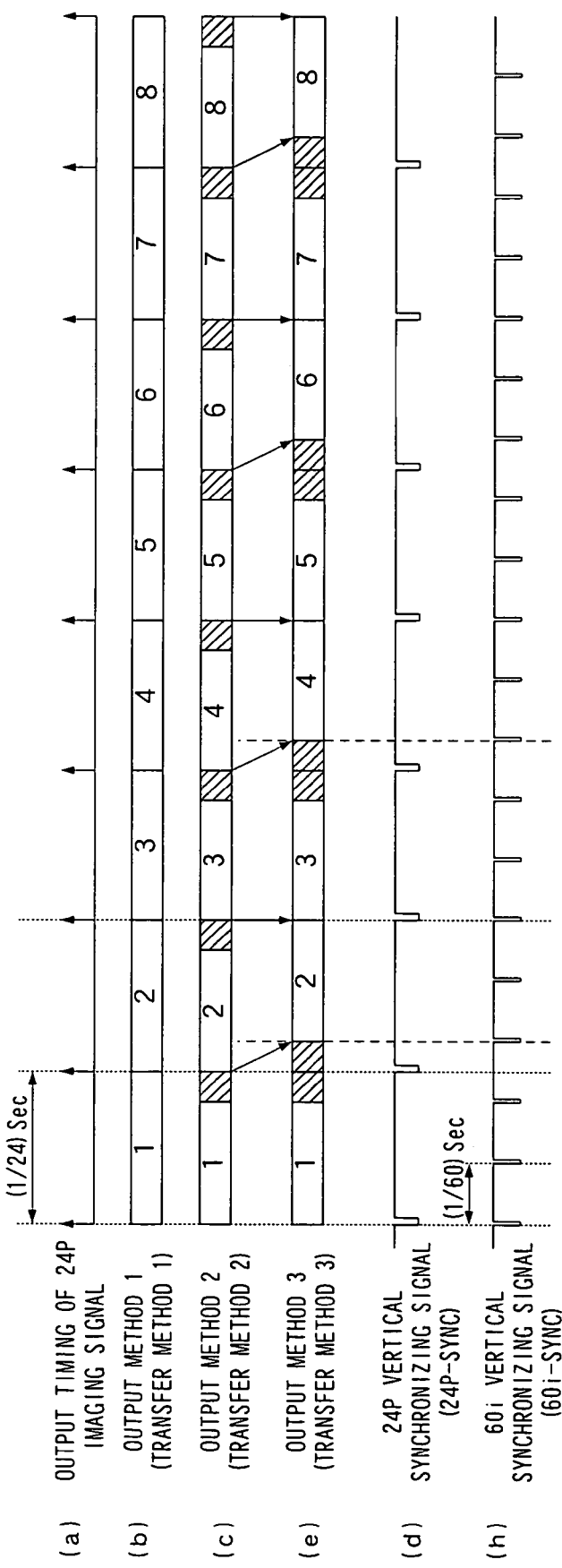
FIG. 5 is a diagram for explaining the operations of the imaging apparatus according to Embodiment 2 of the present invention.

Referring to FIGS. 3, 4, and 5, the following will describe the operations of the imaging apparatus configured thus according to Embodiment 2. Operations other than the imaging section are the same as Embodiment 1 and thus the explanation thereof is omitted.

FIG. 5 is a diagram for explaining the operations of the imaging apparatus and shows the signal states and operations of (a) to (e) and (h) shown in FIGS. 3 and 4. FIGS. 5(*a*) to 5(*e*) and 5(*h*) show the same signal states and operations as FIGS. 2(*a*) to 2(*e*) and FIG. 2(*h*).

Based on the 24p vertical synchronizing signal (FIG. 5(*d*)) and the 60*i* vertical synchronizing signal (FIG. 5(*h*)) from the synchronizing signal generating section 6, the imaging signal driving pulse generation circuit 11 can output the following four pulses:

a reading pulse for starting the reading of the 24p imaging signal (FIG. 5(*a*)), the transfer pulse 1 for transferring the 24p imaging signal over a (½4) second (FIG. 5(*b*)), the transfer pulse 2 for transferring the 24p imaging signal over a (⅓0) second (FIG. 5(*c*)), and the transfer pulse 3 (not shown) obtained by delaying the start of transferring the transfer pulse 2 by a time during which the 60*i* signal is subjected to (½) field scanning.

The switching circuit 12 switches and outputs the transfer pulses 1 to 3 according to the decision results of the synchronizing signal phase decision circuit 13. In the present embodiment, the transfer pulses 2 and 3 are switched and outputted.

The synchronizing signal phase decision circuit 13 detects the phases of the 24p vertical synchronizing signal and the 60*i* vertical synchronizing signal from the synchronizing signal generating section 6. When the 24p vertical synchronizing signal is equal in phase to the 60*i* vertical synchronizing signal, the switching circuit 12 outputs a control signal for selecting the transfer pulse 2. When the signals are not equal in phase, the switching circuit 12 outputs a control signal for selecting the transfer pulse 3.

With these operations, the 24p imaging signal outputted from the imaging section 9 is shaped like that of FIG. 5(*e*). That is, according to the imaging apparatus of Embodiment 2, it is possible to output the 24p imaging signal in synchronization with the 60*i* vertical synchronizing signal and thus obtain the same effect as Embodiment 1 without the need for the delay section of Embodiment 1.

That is, according to Embodiment 2, the photographed image state detecting section 7 can detect a state of a photographed image and output a control signal in synchronization with the vertical synchronizing signal of the 60*i* signal. For this reason, even when the photographed image state detecting section is designed mainly for detecting a state of a photographed image for the 60*i* signal, the detection of a state of a photographed image for the 24p imaging signal does not become complicated, the detection using a photographed image state detecting circuit for the 60*i* signal. Therefore, it is not necessary to add a circuit for the 24p imaging signal.

Further, according to Embodiment 2, the writing operation of a memory section 3 is also performed in synchronization with the vertical synchronizing signal of the 60*i* signal, thereby preventing the circuits in the memory section from varying in signal level. Hence, it is possible to prevent the occurrence of a horizontal stripe around a display position of a (½) field, i.e., around the center of a screen and thus prevent a degradation in picture quality.

Additionally, according to Embodiment 2, the delay section is not necessary. Thus, the circuit size can be reduced with lower cost as compared with Embodiment 1.

EMBODIMENT 3

Figure 6:
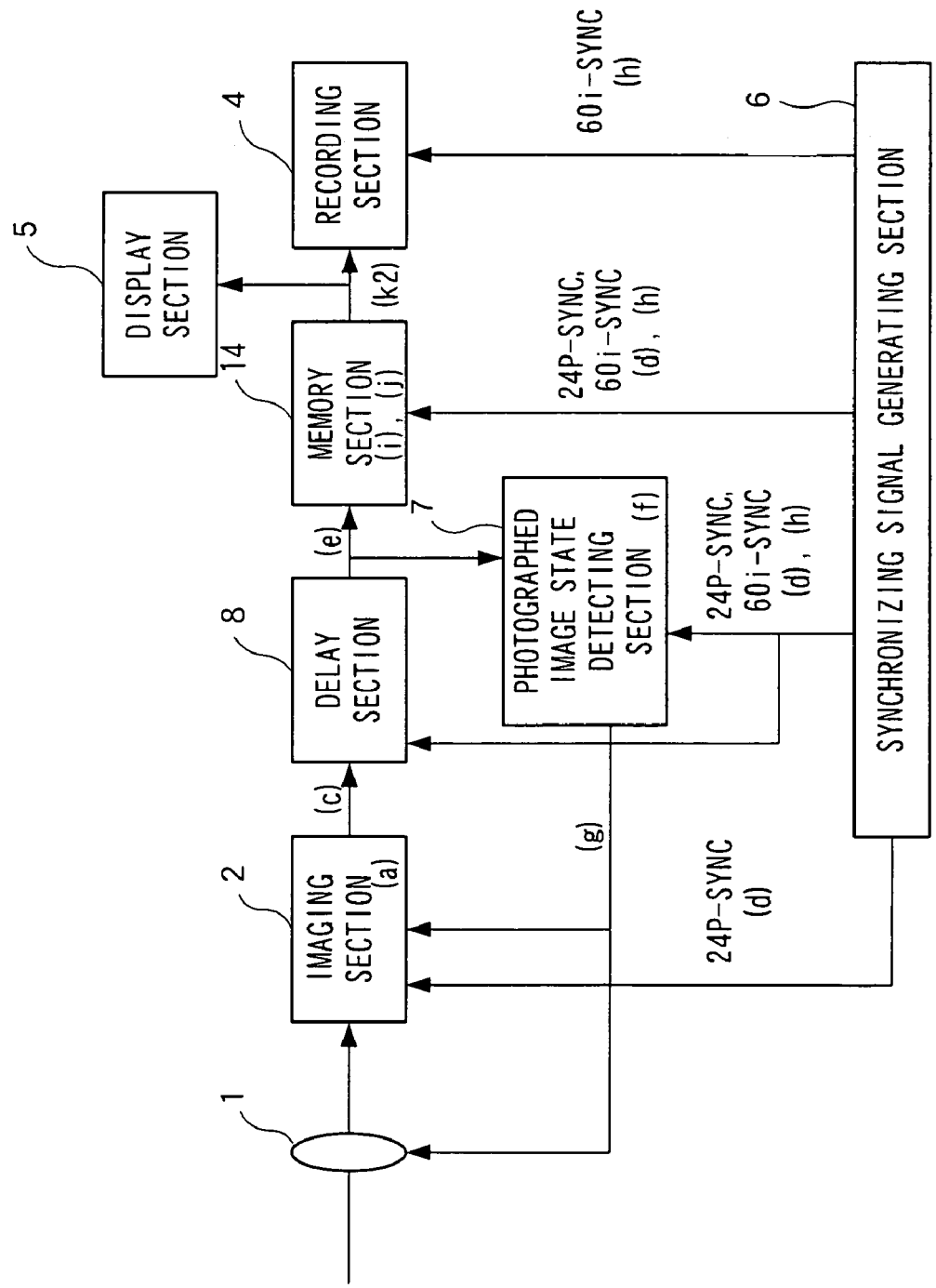
FIG. 6 is a block diagram showing the configuration of an imaging apparatus according to Embodiment 3 of the present invention.

FIG. 6 is a block diagram showing the configuration of an imaging apparatus according to Embodiment 3 of the present invention. Members corresponding to the members described in FIGS. 1 and 15 are indicated by the same reference numerals and the detailed explanation thereof is omitted.

Embodiment 3 is different from Embodiment 1 and the conventional art in the following point: a memory section 14 replaces the fifth field of a 2:3 pull-down signal (the last field obtained by converting two frames of a 24p imaging signal into five frames of a 60i signal) with a mixed signal which is mixed with a frame (60i signal) around the fifth field (including the fifth field). Other sections are almost the same as Embodiment 1 and the conventional art and the operations are also the same as Embodiment 1 and the conventional art.

Figure 7:
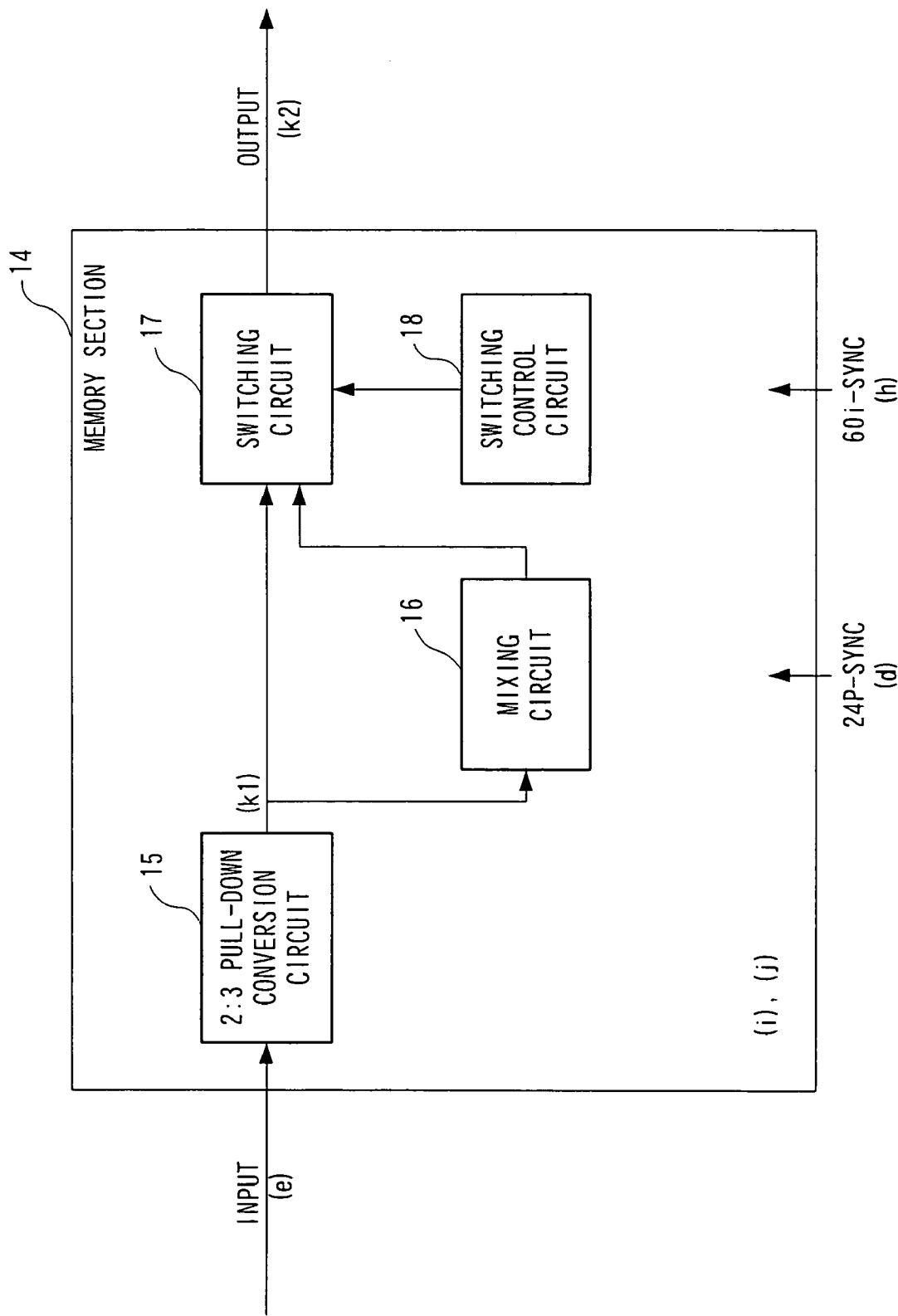
FIG. 7 is a block diagram showing an example of the internal configuration of a memory section in the imaging apparatus according to Embodiment 3 of the present invention.

FIG. 7 is a block diagram showing an example of the internal configuration of the memory section 14. In FIG. 7, reference numeral 15 denotes a 2:3 pull down conversion circuit. The 2:3 pull down conversion circuit 15 performs 2:3 pull-down processing on a 24p imaging signal, converts the signal into a 60i signal, and outputs a so-called 2:3 pull-down signal.

Reference numeral 16 denotes a mixing circuit. The mixing circuit 16 mixes a given frame of the 60i signal to generate a signal of one field of the 60i signal (mixed signal)

Reference numeral 17 denotes a switching circuit. The switching circuit 17 switches and outputs the 2:3 pull-down signal from the 2:3 pull-down conversion circuit 15 and the mixed signal from the mixing circuit 16.

Reference numeral 18 denotes a switching control circuit. The switching control circuit 18 controls the switching circuit 17.

Figure 8:
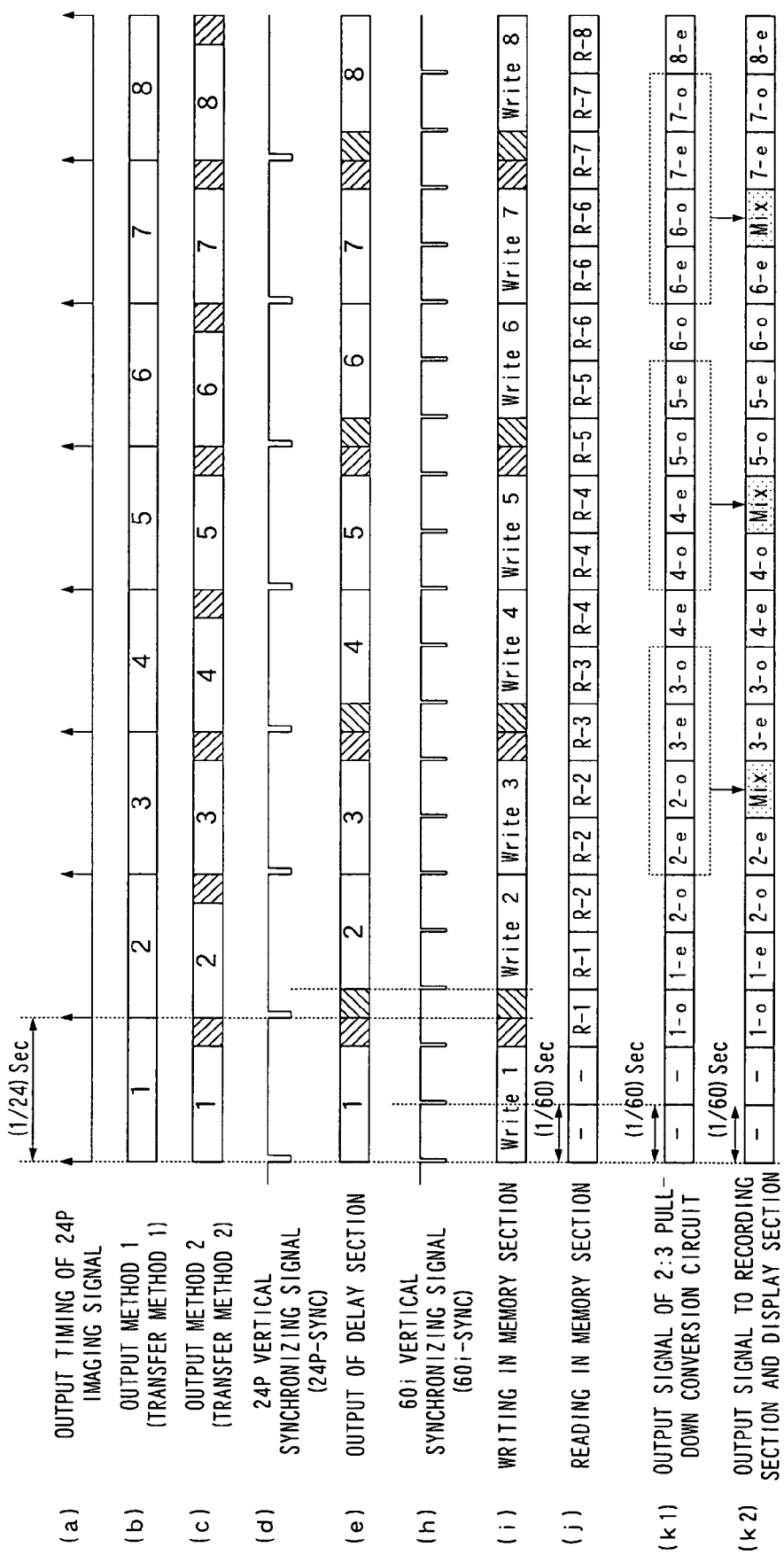
FIG. 8 is a diagram for explaining the operations of the imaging apparatus according to Embodiment 3 of the present invention.

Referring to FIGS. 6, 7, and 8, the following will describe the operations of the imaging apparatus configured thus according to Embodiment 3. FIG. 8 is a diagram for explaining the operations of the imaging apparatus and shows the signal states and operations of (a) to (k1) and (k2) shown in FIGS. 6 and 7. The operations and signal states of FIGS. 8(a) to 8(j) are completely the same as Embodiment 1 (FIGS. 2(a) to 2(j)) and thus the explanation thereof is omitted. FIG. 8(k1) shows an output signal of the 2:3 pull-down conversion circuit 15 and FIG. 8(k2) shows an output signal to a recording section 4 and a display section 5.

As with Embodiment 1, when the signal of FIG. 8(e) is inputted to the memory section 14, the 2:3 pull-down conversion circuit 15 performs a writing operation and a reading operation shown in FIGS. 8(i) and 8(j) and outputs the 2:3 pull-down signal. The mixing circuit 16 adds a 60i signal corresponding to two or more successive frames of the original 24p imaging signal, for example, a signal with frames (2-e, 2-o) and (3-e, 3-o). Then, the mixing circuit 16 outputs a mixed signal. At this point, the mixing circuit 16 outputs a mixed signal in phase with the fifth field of the 2:3 pull-down signal to be replaced. For example, the mixing circuit 16 selects an arithmetic filter according to whether the field to be replaced is on an odd-numbered line or an even-numbered line, and performs an addition.

The switching circuit 17 switches and outputs the output of the 2:3 pull-down conversion circuit 15 and the output of the mixing circuit 16 under the control of the switching control circuit 18.

The switching control circuit 18 controls the switching circuit 17 so that the fifth field of the 2:3 pull-down signal is replaced with the mixed signal generated by the mixing circuit 16 (FIG. 8(k2)). In the signal of FIG. 8(k2), a delay made by an operation is omitted.

As describe above, according to the imaging apparatus of Embodiment 3, a field (mixed signal) interpolating a field around the fifth field of the 2:3 pull-down signal is generated by adding frames of the 60i signal that correspond to two or more frames of the original 24p imaging signal, and the fifth field can be replaced with the generated field. Thus, it is possible to reduce jerky motions which are the problem of 2:3 pull down.

Without the need for a signal of two or more frames, the mixing circuit adds, for example, only a frame including the fifth field and the subsequent frame as long as jerky motions are reduced.

EMBODIMENT 4

FIG. 9 is a block diagram showing the configuration of an imaging apparatus according to Embodiment 4 of the present invention. Members corresponding to the members described in FIG. 15 are indicated by the same reference numerals and the detailed explanation thereof is omitted.

Embodiment 4 is different from the conventional art in the following point: a synchronizing signal generating section 6 generates a vertical synchronizing signal (60i-SYNC2) specifically for display.

A display section 19 converts a 2:3 pull-down signal, which has been inputted from a memory section 3, into 60i signal frames one-to-one correspondence with the frames of the original 24p imaging signal, in which the fifth field (the last field obtained by converting two frames of the 24p imaging signal into five fields of the 60i signal) of the 2:3 pull-down signal is removed. Then, the display section 19 inserts signals at a given level between frames so as to have equal intervals, and adds the vertical synchronizing signal specifically for display to generate a display signal.

Other sections are almost the same as the conventional art and operations are also the same as the conventional art.

FIG. 10 is a block diagram showing an example of the internal configuration of the display section 19. In FIG. 10, reference numeral 20 denotes a delay circuit. The delay circuit 20 delays a 2:3 pull-down signal, which has been inputted from the memory section 3, by a time during which the 60i signal is subjected to (½) field scanning.

Reference numeral 21 denotes a switching circuit. The switching circuit 21 switches and outputs the 2:3 pull-down signal, which has been inputted from the memory section 3, a signal from the delay circuit 20, and a signal at a given level.

Reference numeral 22 denotes an adding circuit. The adding circuit 22 adds the vertical synchronizing signal (60i-SYNC2) specifically for display to an output signal from the switching circuit 21.

Reference numeral 23 denotes timing pulse generating circuit. The timing pulse generating circuit 23 control the switching operation of the switching circuit 21.

Figure 11:
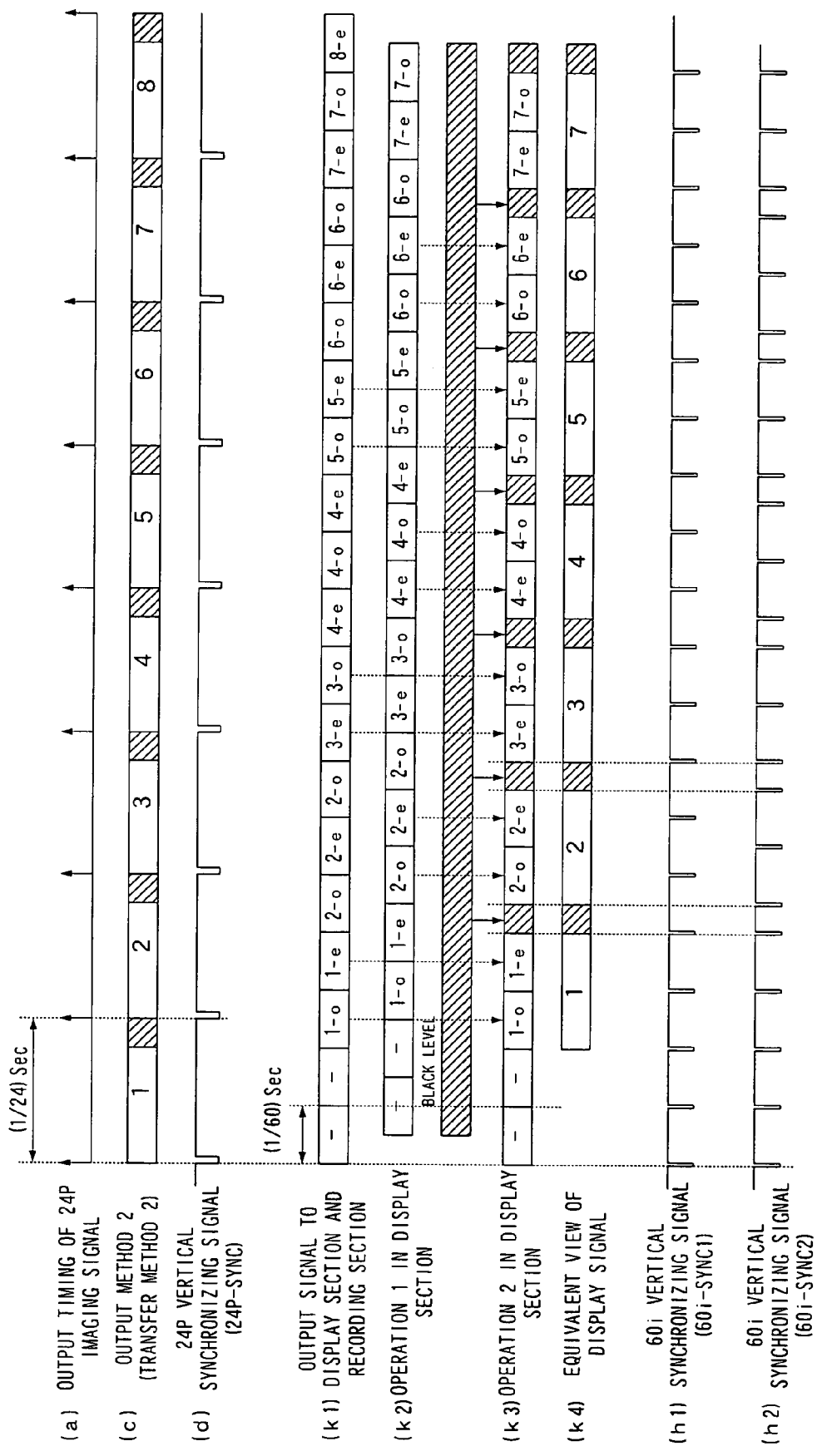
FIG. 11 is a diagram for explaining the operations of the imaging apparatus according to Embodiment 4 of the present invention.

Referring to FIGS. 9, 10, and 11, the following will describe the operations of the imaging apparatus configured thus according to Embodiment 4. Operations other than those of the synchronizing signal generating section and the display section are the same as the conventional art and thus the explanation thereof is omitted.

FIG. 11 is a diagram for explaining the operations of the imaging apparatus and shows the signal states and operations of (a), (c), (d), (k1) to (k4), (h1), and (h2) shown in FIGS. 9 and 10. FIGS. 11(*a*), 11(*c*), and 11(*d*) show the same signal states and operations as FIGS. 16(*a*), 16(*c*), and 16(*d*).

FIG. 11(*k*1) shows an output signal to a recording section 4 and a display section 5.

FIGS. 11(*k*2) and 11(*k*3) show signal states and operations in the display section 19.

FIG. 11(*k*4) shows an equivalent view of a display signal.

FIG. 11(*h*1) shows the 60*i* vertical synchronizing signal.

FIG. 11(*h*2) shows the 60*i* vertical synchronizing signal specifically for display.

The 2:3 pull-down signal shown in FIG. 11(*k*1) is inputted from the memory section 3 to the display section 19 and the recording section 4. In this case, the display section 19 converts the signal as follows: the delay circuit 20 in the display section 19 delays the 2:3 pull-down signal by a time during which the 60*i* signal is subjected to (½) field scanning (FIG. 11(*k*2)). Then, the switching circuit 21 switches the original 2:3 pull-down signal, the delayed signal, and a signal at a given level (e.g., black level) and outputs a signal of FIG. 11(*k*3). Namely, the switching circuit 21 removes the fifth field of the 2:3 pull-down signal so that a displayed frame image of the 60*i* signal has one-to-one correspondence with the frame of the original 24p imaging signal, and the switching circuit 21 inserts a signal at a given level so that the 60*i* signal has equal frame intervals (FIG. 11(*k*3)).

The timing pulse generation circuit 23 generates a predetermined switching pulse so as to control the switching circuit 21, which outputs the signal of FIG. 11(*k*3). That is, the timing pulse generation circuit 23 generates the predetermined switching pulse based on a 60*i* vertical synchronizing signal 1 (FIG. 11(*h*1)) and a signal obtained by delaying the 60*i* vertical synchronizing signal 1 by a time during which the 60*i* signal is subjected to (½) field scanning.

The adding circuit 22 adds a 60*i* vertical synchronizing signal 2 shown in FIG. 11(*h*2) to the output signal of the switching circuit 21 so that the output signal (the signal of FIG. 11(*k*3)) of the switching circuit 21 is properly displayed on a display element such as a cathode-ray tube. The 60*i* vertical synchronizing signal 2 is obtained by shortening a vertical scanning period in the period of the 60*i* vertical synchronizing signal according to the length of the period of the signal at the given level, the signal being inserted so as to have equal frame intervals.

As described above, according to Embodiment 4, it is possible to convert the 2:3 pull-down signal into the frame of the 60*i* signal which has one-to-one correspondence with the original 24p imaging signal in which the fifth field of the 2:3 pull-down signal is removed, and it is possible to have equal frame intervals (FIG. 11(*k*4)). Hence, it is possible to form a signal with equal intervals while having one-to-one correspondence with the frame of the original 24p imaging signal, thereby reducing jerky motions which are the problem of 2:3 pull down.

By using a black level signal as a signal at a given level, it is possible to reproduce flicker (black level) of a mechanical shutter as in the photographing of a film camera.

In Embodiment 4, the delay circuit 20, the switching circuit 21, and the timing pulse generation circuit 23 are used to convert the 2:3 pull-down signal into the 60*i* signal having one-to-one correspondence with the original 24p imaging signal. The used circuits are not limited to this example as long as the same operations are performed.

EMBODIMENT 5

Figure 12:
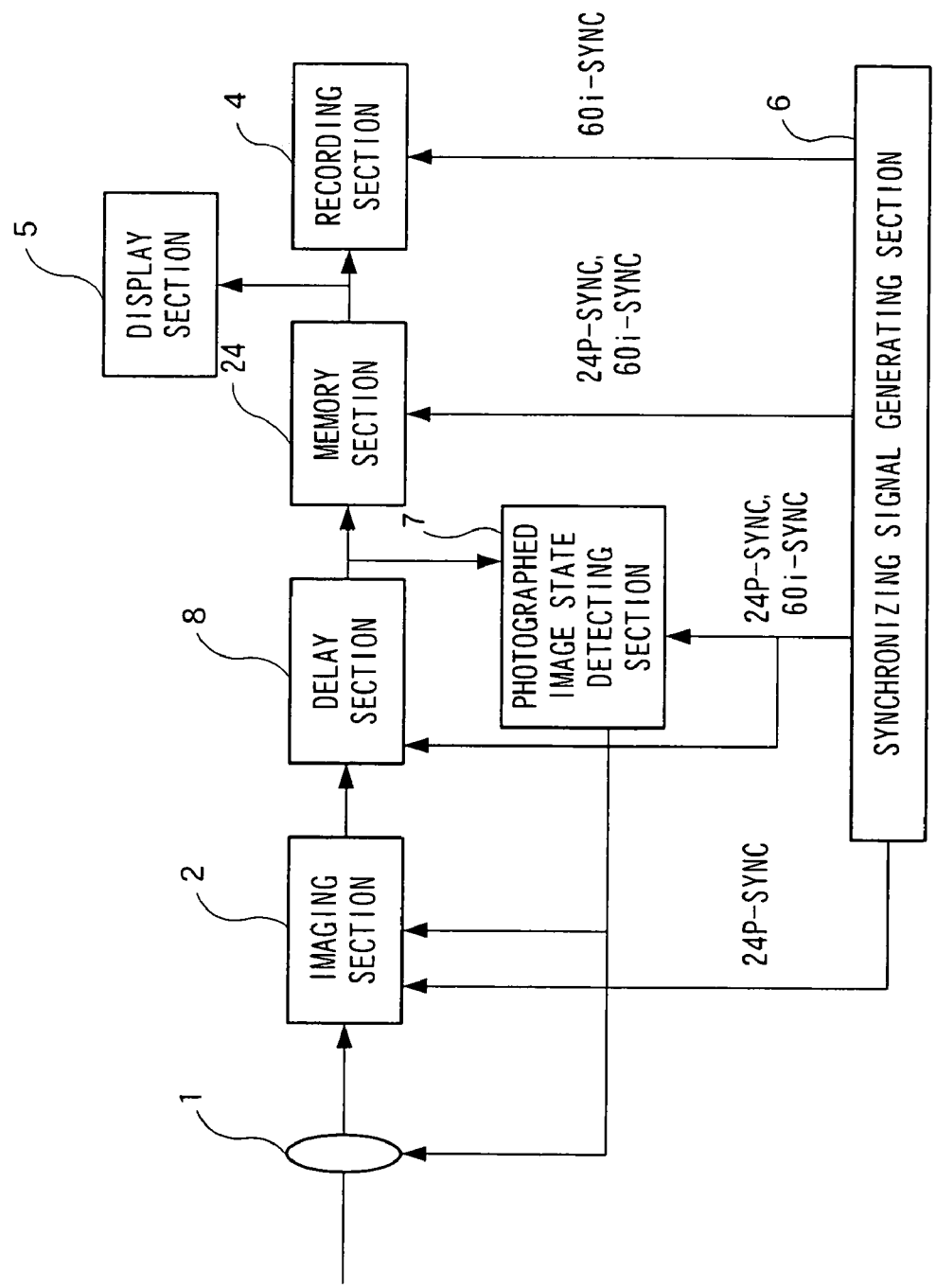
FIG. 12 is a block diagram showing the configuration of an imaging apparatus according to Embodiment 5 of the present invention.

FIG. 12 is a block diagram showing the configuration of an imaging apparatus according to Embodiment 5 of the present invention. Members corresponding to the members described in FIGS. 1 and 15 are indicated by the same reference numerals and the detailed explanation thereof is omitted.

Embodiment 5 is different from Embodiment 1 and the conventional art in that an LPF (low-pass filter) for limiting the vertical band of a 24p imaging signal is provided in a memory section 24 and 2:3 pull-down processing is performed after the vertical band of the inputted 24p imaging signal is limited. Other sections are almost the same as Embodiment 1 and the conventional art and the operations are also the same as Embodiment 1 and the conventional art.

Figure 13:
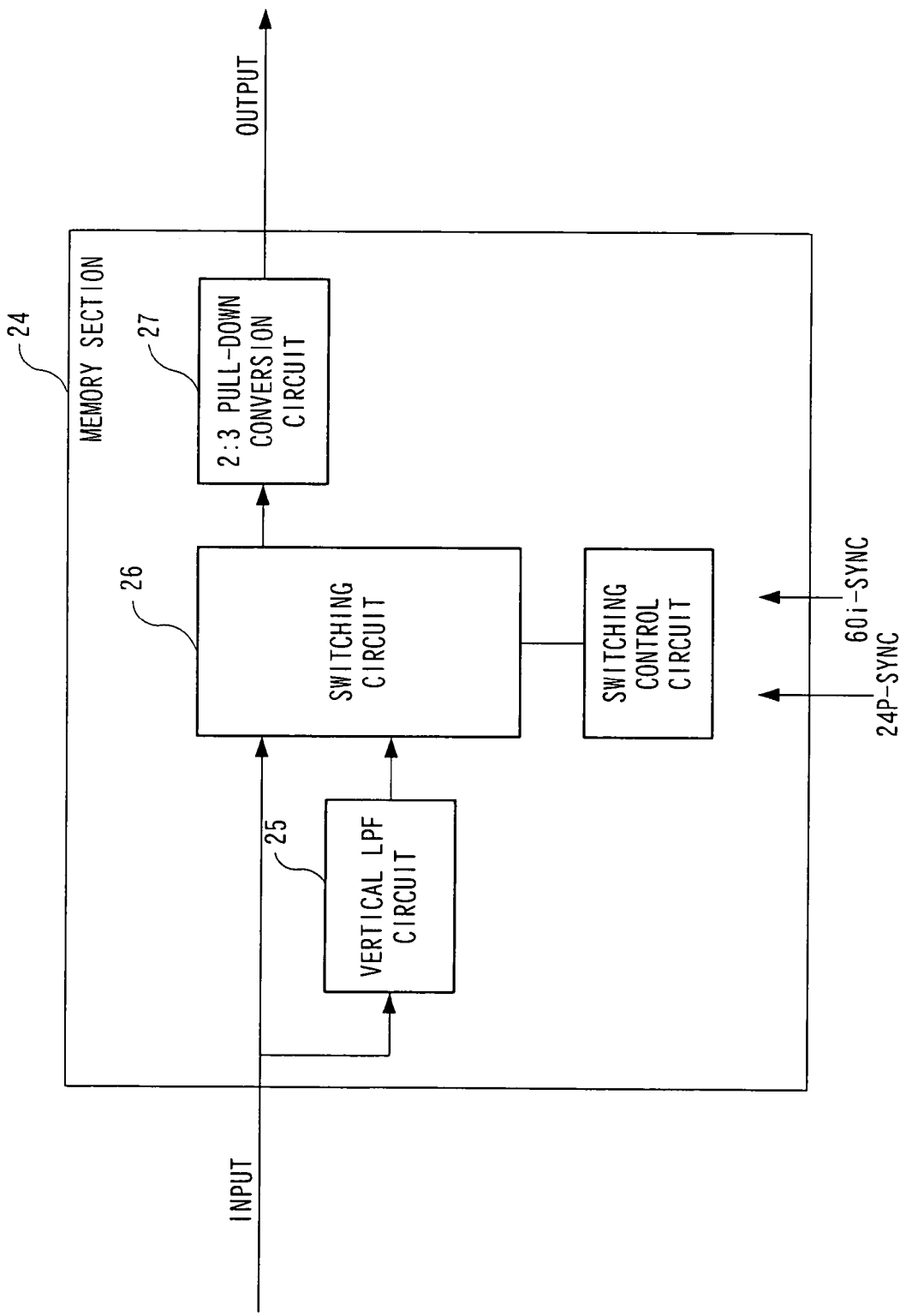
FIG. 13 is a block diagram showing an example of the internal configuration of a memory section in the imaging apparatus according to Embodiment 5 of the present invention.

FIG. 13 is a block diagram showing an example of the internal configuration of the memory section 24. In FIG. 13, reference numeral 25 denotes a vertical LPF circuit (low-pass filter for limiting a vertical band). The vertical LPF circuit 25 limits the vertical band of the 24p imaging signal.

Reference numeral 26 denotes a switching circuit. The switching circuit 26 switches the inputted original 24p imaging signal and an output signal from the vertical LPF circuit 25 to output the switched signal.

Reference numeral 27 denotes a 2:3 pull-down conversion circuit. The 2:3 pull-down conversion circuit 27 performs 2:3 pull-down processing on the 24p imaging signal, converts the signal into a 60*i* signal, and outputs a so-called 2:3 pull-down signal.

Reference numeral 28 denotes a switching control circuit. The switching control circuit 28 controls the switching circuit 26.

Figure 14:
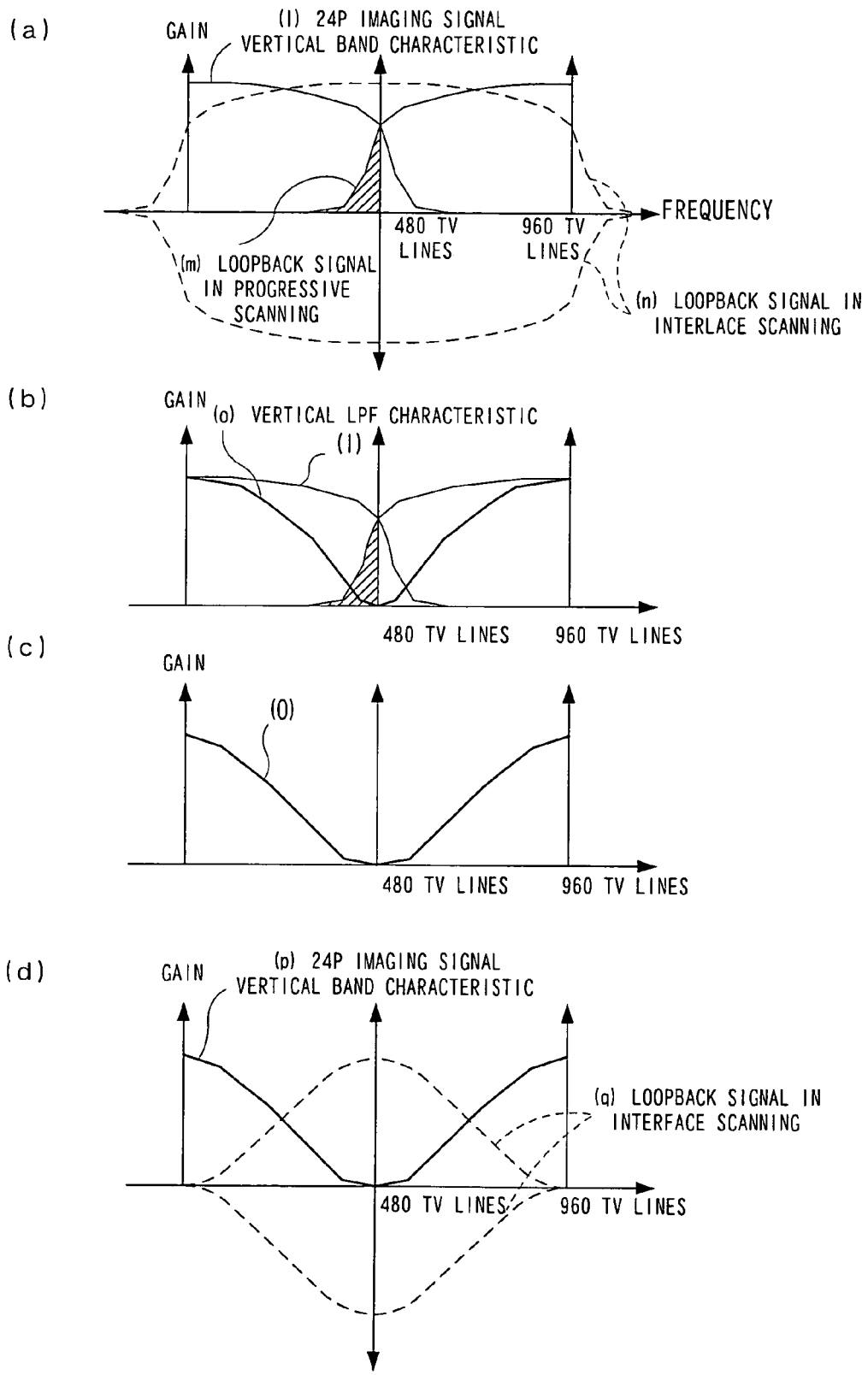
FIG. 14 is a diagram for explaining the vertical band limit of a vertical LPF circuit in the imaging apparatus according to Embodiment 5 of the present invention.

Referring to FIGS. 12, 13, and 14, the following will describe the operations of the imaging apparatus configured thus according to Embodiment 5.

FIG. 14 is a diagram for explaining a limit imposed by the vertical LPF circuit 25 on the vertical band of the 24p imaging signal. In FIG. 14, (1) represents a vertical band characteristic of the 24p imaging signal.

(m) represents an aliasing signal in progressive scanning.

(n) represents an aliasing signal in interlace scanning.

(o) represents a vertical LPF characteristic.

(p) represents a vertical band characteristic of the 24p imaging signal with a limited vertical band.

(q) represents an aliasing signal in interlace scanning after the vertical band is limited.

When the 24p imaging signal has a vertical resolution about twice that of an image signal obtained by the interlace scanning system which is a standard television system, the 24p imaging signal has a high vertical band characteristic (1) as shown in FIG. 14(*a*). In this way, when the 24p imaging signal with a high vertical band is sampled at a vertical scanning frequency (960 TV lines) twice that of the standard television system, folding noise occurs like a diagonally shaded part.

Sampling is performed at a vertical scanning frequency (480 TV lines) of the standard television system on the 2:3 pull-down signal (60*i* signal), which is obtained by performing 2:3 pull-down processing on the 24p imaging signal causing folding noise on the aliasing signal (m) with a high vertical band. In this case, the aliasing signal (n) becomes a wideband signal with a high vertical band as indicated by dotted lines in FIG. 14(a).

In general, when a signal of the standard television system is sampled at a frequency of 480 TV lines, the aliasing signal has a different phase in each field. Thus, the aliasing signal operates so as to be canceled by a monitor or human eyes. However, when a signal with a high vertical band is sampled, a vertical band becomes wide and thus the aliasing signal is detected as flicker and reduces visibility on a screen.

For this reason, when the 60i signal is displayed, which is obtained by performing 2:3 pull-down processing on the 24p imaging signal having a vertical resolution nearly twice that of the standard television system, as described above, an aliasing signal is detected as flicker and reduces visibility on the screen.

Thus, in the imaging apparatus of Embodiment 5, the vertical LPF circuit for limiting a vertical band is provided as shown in FIG. 14(c). After the vertical band of the 24p imaging signal is limited by the vertical LPF circuit, 2:3 pull-down processing is performed. That is, in the imaging apparatus of Embodiment 5, as shown in FIG. 14(b), the vertical band of the 24p imaging signal is limited from (l) to (o) to prevent the folding noise and then 2:3 pull-down processing is performed. To be specific, for example, by adding vertically adjacent two lines of the 24p imaging signal, the vertical band of the 24p imaging signal can be limited from (l) to (o).

By limiting the vertical band thus to prevent folding noise, as indicated by dotted lines of FIG. 14(d), the vertical band of the aliasing signal (n) can be properly narrowed for the 60i signal obtained by 2:3 pull-down processing, thereby considerably reducing flicker and improving picture quality.

The switching circuit 26 switches the original 24p imaging signal and the signal whose vertical band is limited, and outputs the switched signal to the 2:3 pull-down conversion circuit 27. As in the other embodiments, the 2:3 pull-down conversion circuit 27 converts the 24p imaging signal into the 60i signal and outputs the signal to a recording section 4 and a display section 5.

Besides, the switching circuit 26 may be controlled so that only the 2:3 pull-down signal outputted to the display section 5 and an external monitor has a limited vertical band.

Further, when the 60i signal recorded in a recording medium is subjected to 2:3 reverse pull-down conversion and is used for an external device and so on which has the function of returning a 2:3 pull-down signal to a progressive signal, the switching circuit 26 is controlled so as to record, in a recording medium, the 2:3 pull-down signal having a vertical band characteristic of a wide band where a vertical band is not limited. When the 60i signal recorded in the recording medium is used as it is, the switching circuit 26 is controlled so as to record, in the recording medium, the 2:3 pull-down signal having a limited vertical band. It is needless to say that switching can be freely selected as appropriate.

As described above, according to the imaging apparatus of Embodiment 5, it is possible to reduce flicker caused by performing 2:3 pull-down processing on the 24p imaging signal to convert the signal into the 60i signal, thereby reducing a degradation in picture quality and flicker on the display section.

As described above, according to the imaging apparatus of the present invention, the 24p imaging signal with a frame frequency of 24 Hz according to a progressive scanning system is converted by 2:3 pull-down processing into the 60i signal with a field frequency of 60 Hz according to an interlace scanning system which is a standard television system. In this imaging apparatus, when the output of the 24p imaging signal is not equal to the phase of the 60i vertical synchronizing signal, the output timing is delayed by a time during which the 60i signal is subjected to (½) field scanning, so that the 24p imaging signal can be written in the memory section in synchronization with the 60i vertical synchronizing signal. With this operation, the circuits in the memory section are not varied in signal level and thus it is possible to prevent the occurrence of a horizontal stripe and the like at the center of a screen and prevent a degradation in picture quality.

Further, by delaying the output of the 24p imaging signal in the above manner, the processing of the photographed image state detecting section is performed in synchronization with the 60i vertical synchronizing signal. Hence, a photographed image can be readily detected for the 24p imaging signal by using a circuit for the 60i signal of the photographed image state detecting section, thereby eliminating the need for additional circuit for the 24p imaging signal.

Moreover, two frames of the 24p imaging signal are converted into five fields of the 60i signal by 2:3 pull-down processing, and frames of the 60i signal are added that correspond to two or more successive frames of the original 24p imaging signal, so that a mixed signal is generated which interpolates a field around the fifth field having been converted by 2:3 pull-down processing. Then, by replacing the fifth field with the mixed signal, it is possible to reduce jerky motions which are the problem of 2:3 pull down.

Further, the 2:3 pull-down signal is converted into the frame of the 60i signal which has one-to-one correspondence with the frame of the original 24p imaging signal in which the fifth field converted by 2:3 pull-down processing is removed. Then, a display signal is generated which has a black level signal inserted so as to have equal frame intervals. Hence, it is possible to reduce jerky motions which are the problem of 2:3 pull down and reproduce flicker of a mechanical shutter as in the photographing of a film camera.

Moreover, the vertical band of an aliasing signal of the 2:3 pull-down signal (60i signal) is narrowed by limiting the vertical band of the 24p imaging signal, thereby considerably reducing flicker and improving picture quality.

The invention claimed is:

1. An imaging apparatus for converting, by 2:3 pull-down processing, a 24p imaging signal generated with a frame frequency of 24 Hz according to a progressive scanning system into a 60i signal with a field frequency of 60 Hz according to an interlace scanning system, which is a standard television system, the imaging apparatus comprising:

an imaging section for outputting a 24p imaging signal of one frame over a (1/30) second every (1/24) second in synchronization with a vertical synchronizing signal of the 24p imaging signal;

a delay section for outputting a 24p imaging signal of one frame as it is when the 24p imaging signal is outputted from the imaging section at the same timing as a phase of a vertical synchronizing signal of the 60i signal, and outputting the 24p imaging signal of one frame after delaying the 24p imaging signal by a time during which the 60i signal is subjected to (½) field scanning when the 24p imaging signal is outputted at different timing;

a memory section for writing, over a (1/30) second, the 24p imaging signal of one frame having been outputted from the delay section, and outputting a so-called 2:3 pull-down signal, in which two frames of the 24p imaging signal are converted into the 60*i* signal of five fields by 2:3 pull-down processing, every ($\frac{1}{60}$) second in synchronization with the vertical synchronizing signal of the 60*i* signal;

a recording section for recording the 2:3 pull-down signal from the memory section in a recording medium; and a display section for displaying the 2:3 pull-down signal from the memory section.

2. An imaging apparatus for converting, by 2:3 pull-down processing, a 24p imaging signal generated with a frame frequency of 24 Hz according to a progressive scanning system into a 60*i* signal with a field frequency of 60 Hz according to an interlace scanning system, which is a standard television system, the imaging apparatus comprising:

an imaging section for outputting the 24p imaging signal of one frame over a ($\frac{1}{30}$) second in synchronization with a vertical synchronizing signal of the 24p imaging signal when the vertical synchronizing signal of the 24p imaging signal is equal in phase to a vertical synchronizing signal of the 60*i* signal, and starting outputting the 24p imaging signal after delaying the 24p imaging signal by a time during which the 60*i* signal is subjected to ($\frac{1}{2}$) field scanning when the signals are not equal in phase;

a memory section for writing, over a ($\frac{1}{30}$) second, the 24p imaging signal of one frame having been outputted from the imaging section, and outputting, every ($\frac{1}{60}$) second in synchronization with the vertical synchronizing signal of the 60*i* signal, a so-called 2:3 pull-down signal in which two frames of the 24p imaging signal are converted into the 60*i* signal of five fields by 2:3 pull-down processing;

a recording section for recording the 2:3 pull-down signal from the memory section in a recording medium; and a display section for displaying the 2:3 pull-down signal from the memory section.

3. The imaging apparatus according to claim 1, wherein in the memory section, two frames of the 24p imaging signal are converted into the 60*i* signal of five fields by 2:3 pull-down processing, and a mixed signal is generated by adding frames of the 60*i* signal, the frames corresponding to two or more successive frames of the original 24p imaging signal, and the 60*i* signal of the fifth field having been converted by 2:3 pull-down processing is replaced with the mixed signal before being outputted.

4. The imaging apparatus according to claim 2, wherein in the memory section, two frames of the 24p imaging signal are converted into the 60*i* signal of five fields by 2:3 pull-down processing, and a mixed signal is generated by adding frames of the 60*i* signal, the frames corresponding to two or more successive frames of the 24p imaging signal, and the 60*i* signal of the fifth field having been converted by 2:3 pull-down processing is replaced with the mixed signal before being outputted.

5. The imaging apparatus according to claim 3, wherein the mixed signal is generated by adding a frame including the fifth field and a subsequent frame.

6. The imaging apparatus according to claim 4, wherein the mixed signal is generated by adding a frame including the fifth field and a subsequent frame.

7. The imaging apparatus according to claim 3, wherein the mixed signal is generated in phase with the fifth field.

8. The imaging apparatus according to claim 4, wherein the mixed signal is generated in phase with the fifth field.

9. The imaging apparatus according to claim 5, wherein the mixed signal is generated in phase with the fifth field.

10. The imaging apparatus according to claim 6, wherein the mixed signal is generated in phase with the fifth field.

11. An imaging apparatus for converting, by 2:3 pull-down processing, a 24p imaging signal generated with a frame frequency of 24 Hz according to a progressive scanning system into a 60*i* signal with a field frequency of 60 Hz according to an interlace scanning system, which is a standard television system, the imaging apparatus comprising:

an imaging section for outputting a 24p imaging signal of one frame over a ($\frac{1}{30}$) second every ($\frac{1}{24}$) second in synchronization with a vertical synchronizing signal of the 24p imaging signal;

a memory section for writing, over a ($\frac{1}{30}$) second, the 24p imaging signal of one frame having been outputted from the imaging section, and outputting, every ($\frac{1}{60}$) second in synchronization with the vertical synchronizing signal of the 60*i* signal, a so-called 2:3 pull-down signal in which two frames of the 24p imaging signal are converted into the 60*i* signal of five fields by 2:3 pull-down processing;

a recording section for recording the 2:3 pull-down signal from the memory section in a recording medium; and a display section for converting the 2:3 pull-down signal from the memory section into a frame of the 60*i* signal having one-to-one correspondence with a frame of the original 24p imaging signal in which a fifth field is removed, generating a display signal having a black level signal inserted thereby to have equal frame intervals, and displaying the display signal.

12. An imaging apparatus for converting, by 2:3 pull-down processing, a 24p imaging signal generated with a frame frequency of 24 Hz according to a progressive scanning system into a 60*i* signal with a field frequency of 60 Hz according to an interlace scanning system, which is a standard television system, the imaging apparatus comprising:

an imaging section for outputting a 24p imaging signal of one frame over a ($\frac{1}{30}$) second every ($\frac{1}{24}$) second in synchronization with a vertical synchronizing signal of the 24p imaging signal;

a memory section for limiting a vertical band of the 24p imaging signal of one frame having been outputted from the imaging section, writing the signal in a memory area over a ($\frac{1}{30}$) second, and outputting a so-called 2:3 pull-down signal in which two frames of the 24p imaging signal are converted into the 60*i* signal of five fields by 2:3 pull-down processing, every ($\frac{1}{60}$) second in synchronization with a vertical synchronizing signal of the 60*i* signal;

a recording section for recording the 2:3 pull-down signal from the memory section in a recording medium; and a display section for displaying the 2:3 pull-down signal from the memory section.

13. The imaging apparatus according to claim 12, wherein the memory section limits the vertical band by adding vertically adjacent two lines of the 24p imaging signal.

14. The imaging apparatus according to claim 12, wherein the memory section is capable of outputting a 2:3 pull-down signal obtained by 2:3 pull-down processing after limiting the vertical band of the 24p imaging signal and a 2:3 pull-down signal obtained by 2:3 pull-down processing without limiting the vertical band, the memory section outputting the latter 2:3 pull-down signal to the recording section and outputting the former 2:3 pull-down signal to the display section.

15. The imaging apparatus according to claim 13, wherein the memory section is capable of outputting a 2:3 pull-down signal obtained by 2:3 pull-down processing after limiting the vertical band of the 24p imaging signal and a 2:3 pull-down signal obtained by 2:3 pull-down processing without limiting the vertical band, the memory section outputting the latter 2:3 pull-down signal to the recording section and outputting the former 2:3 pull-down signal to the display section.

* * * * *